United States Patent
Purwar et al.

(10) Patent No.: US 10,818,007 B2
(45) Date of Patent: Oct. 27, 2020

(54) SYSTEMS AND METHODS FOR DETERMINING APPARENT SKIN AGE

(71) Applicants: The Procter & Gamble Company, Cincinnati, OH (US); Palo Alto Research Center Incorporated, Palo Alto, CA (US)

(72) Inventors: Ankur Purwar, Singapore (SG); Paul Jonathan Matts, Addlestone (GB); Matthew Adam Shreve, Webster, NY (US); Wencheng Wu, Webster, NY (US); Beilei Xu, Penfield, NY (US)

(73) Assignee: The Procter & Gamble Company, Cincinnati, OH (US)

(*) Notice: Subject to any disclaimer, the term of this patent is extended or adjusted under 35 U.S.C. 154(b) by 165 days.

(21) Appl. No.: 15/993,950

(22) Filed: May 31, 2018

(65) Prior Publication Data

US 2018/0350071 A1    Dec. 6, 2018

Related U.S. Application Data

(60) Provisional application No. 62/513,186, filed on May 31, 2017.

(51) Int. Cl.
*G06K 9/00* (2006.01)
*G06T 7/00* (2017.01)
(Continued)

(52) U.S. Cl.
CPC ........ *G06T 7/0012* (2013.01); *G06K 9/00228* (2013.01); *G06K 9/00281* (2013.01);
(Continued)

(58) Field of Classification Search
CPC ......... G06T 7/0012; G06T 2207/20081; G06T 2207/20084; G06T 2207/30088;
(Continued)

(56) References Cited

U.S. PATENT DOCUMENTS 4,276,570 A    6/1981    Burson et al.
5,850,463 A    12/1998   Horii
(Continued)

FOREIGN PATENT DOCUMENTS

CN    1870047 A    11/2006
CN    101556699 A    10/2009
(Continued)

OTHER PUBLICATIONS

Jagtap et al., Human Age Classification Using facial Skin Aging Features and Artificial Neural Network, Cognitive Systems Research vol. 40 (2016), pp. 116-128 (Year: 2016).*
(Continued)

*Primary Examiner* — Van D Huynh
(74) *Attorney, Agent, or Firm* — John G. Powell

(57) ABSTRACT

Systems and methods for determining an apparent skin age of a person and providing customized skin care product recommendations. The system utilizes a computing device to mask facial macro features in an image of a person and then analyze the image with a convolutional neural network to determine an apparent skin age of the person. Determining the apparent skin age may include identifying at least one pixel that is indicative of skin age and utilizing the at least one pixel to provide the apparent skin age. The system may be used to determine a target skin age of a person, determine a skin care product or skin care regimen for achieving the target skin age, and provide an option for a user to purchase the product.

18 Claims, 16 Drawing Sheets

(51) Int. Cl.
G06K 9/34 (2006.01)
G06K 9/46 (2006.01)
G06K 9/62 (2006.01)
G06K 9/20 (2006.01)
G06K 9/32 (2006.01)
G06N 3/08 (2006.01)

(52) U.S. Cl.
CPC ....... *G06K 9/00362* (2013.01); *G06K 9/2054* (2013.01); *G06K 9/3233* (2013.01); *G06K 9/346* (2013.01); *G06K 9/4628* (2013.01); *G06K 9/6261* (2013.01); *G06K 9/6274* (2013.01); *G06N 3/08* (2013.01); *G06K 2009/00322* (2013.01); *G06T 2207/20081* (2013.01); *G06T 2207/20084* (2013.01); *G06T 2207/30088* (2013.01); *G06T 2207/30201* (2013.01)

(58) Field of Classification Search
CPC ...... G06T 2207/30201; G06K 9/00362; G06K 9/346; G06K 9/4628; G06K 9/6274; G06K 9/00228; G06K 9/2054; G06K 9/3233; G06K 9/6261; G06K 9/00281; G06K 2009/00322; G06N 3/08
USPC ........................................................ 382/128
See application file for complete search history.

(56) References Cited

U.S. PATENT DOCUMENTS

| | | | |
|---|---|---|---|
| 5,983,120 | A | 11/1999 | Groner et al. |
| 6,556,196 | B1 | 4/2003 | Blanz et al. |
| 6,571,003 | B1 | 5/2003 | Hillebrand et al. |
| 6,619,860 | B1 | 9/2003 | Simon |
| 6,734,858 | B2 | 5/2004 | Attar et al. |
| 6,761,697 | B2 | 7/2004 | Rubinstenn et al. |
| 6,959,119 | B2 | 10/2005 | Hawkins et al. |
| 7,200,281 | B2 | 4/2007 | Zhang et al. |
| 7,362,886 | B2 * | 4/2008 | Rowe ................ G06K 9/00288 382/118 |
| 7,634,103 | B2 | 12/2009 | Rubinstenn et al. |
| 8,014,589 | B2 | 9/2011 | del Valle |
| 8,077,931 | B1 | 12/2011 | Chatman |
| 8,094,186 | B2 | 1/2012 | Fukuoka et al. |
| 8,254,647 | B1 | 8/2012 | Nechyba |
| 8,391,639 | B2 | 3/2013 | Hillebrand et al. |
| 8,401,300 | B2 | 3/2013 | Jiang et al. |
| 8,425,477 | B2 | 4/2013 | Mou |
| 8,491,926 | B2 | 7/2013 | Mohammadi et al. |
| 8,520,906 | B1 | 8/2013 | Moon |
| 8,550,818 | B2 | 10/2013 | Fidaleo et al. |
| 8,582,807 | B2 | 11/2013 | Yang |
| 8,625,864 | B2 | 1/2014 | Goodman |
| 8,666,770 | B2 | 3/2014 | Maes et al. |
| 8,725,560 | B2 | 5/2014 | Aarabi |
| 9,013,567 | B2 | 4/2015 | Clemann |
| 9,189,679 | B2 | 11/2015 | Yamazaki |
| 2001/0037191 | A1 | 11/2001 | Furuta et al. |
| 2003/0065255 | A1 | 4/2003 | Giacchetti et al. |
| 2003/0065589 | A1 | 4/2003 | Giacchetti et al. |
| 2003/0198402 | A1 | 10/2003 | Zhang |
| 2004/0122299 | A1 | 6/2004 | Nakata |
| 2004/0170337 | A1 | 9/2004 | Simon et al. |
| 2004/0213454 | A1 | 10/2004 | Lai et al. |
| 2004/0223631 | A1 | 11/2004 | Waupotitsch |
| 2006/0023923 | A1 | 2/2006 | Geng |
| 2006/0257041 | A1 | 11/2006 | Kameyama et al. |
| 2006/0274071 | A1 | 12/2006 | Bazin |
| 2007/0052726 | A1 | 3/2007 | Wright |
| 2007/0053940 | A1 | 3/2007 | Huang et al. |
| 2007/0070440 | A1 | 3/2007 | Li et al. |
| 2007/0071314 | A1 | 3/2007 | Bhatti |
| 2007/0104472 | A1 | 5/2007 | Quan |
| 2007/0229498 | A1 | 10/2007 | Matusik et al. |
| 2008/0080746 | A1 | 4/2008 | Payonk |
| 2008/0089561 | A1 | 4/2008 | Zhang |
| 2008/0194928 | A1 | 8/2008 | Bandic |
| 2008/0212894 | A1 | 9/2008 | Demirli |
| 2008/0316227 | A1 | 12/2008 | Fleury et al. |
| 2009/0003709 | A1 | 1/2009 | Kaneda |
| 2009/0028380 | A1 | 1/2009 | Hillebrand |
| 2009/0245603 | A1 | 10/2009 | Koruga |
| 2010/0068247 | A1 | 3/2010 | Mou |
| 2010/0172567 | A1 | 7/2010 | Prokoski |
| 2010/0185064 | A1 | 7/2010 | Bandic |
| 2010/0189342 | A1 | 7/2010 | Parr et al. |
| 2010/0329525 | A1 | 12/2010 | Goodman |
| 2011/0016001 | A1 | 1/2011 | Schieffelin |
| 2011/0064331 | A1 | 3/2011 | Andres del Valle |
| 2011/0116691 | A1 * | 5/2011 | Chung .................. A61B 5/442 382/128 |
| 2011/0158540 | A1 | 6/2011 | Suzuki |
| 2011/0196616 | A1 | 8/2011 | Gunn |
| 2011/0222724 | A1 | 9/2011 | Yang |
| 2011/0249891 | A1 | 10/2011 | Li |
| 2011/0300196 | A1 | 12/2011 | Mohammadi |
| 2012/0223131 | A1 | 9/2012 | Lim |
| 2012/0253755 | A1 | 10/2012 | Gobel |
| 2012/0300049 | A1 | 11/2012 | Clemann |
| 2012/0325141 | A1 | 12/2012 | Mohammadi |
| 2013/0013330 | A1 | 1/2013 | Guerra |
| 2013/0029723 | A1 | 1/2013 | Das |
| 2013/0041733 | A1 | 2/2013 | Officer |
| 2013/0079620 | A1 | 3/2013 | Kuth et al. |
| 2013/0089245 | A1 * | 4/2013 | Yamazaki .......... G06K 9/00221 382/118 |
| 2013/0094780 | A1 | 4/2013 | Tang et al. |
| 2013/0158968 | A1 | 6/2013 | Ash et al. |
| 2013/0169621 | A1 | 7/2013 | Mei et al. |
| 2013/0271451 | A1 | 10/2013 | Tong |
| 2013/0325493 | A1 | 12/2013 | Wong et al. |
| 2014/0089017 | A1 | 3/2014 | Klappert et al. |
| 2014/0099029 | A1 | 4/2014 | Savvides |
| 2014/0201126 | A1 | 7/2014 | Zadeh |
| 2014/0209682 | A1 | 7/2014 | Gottwals et al. |
| 2014/0211022 | A1 | 7/2014 | Koh et al. |
| 2014/0219526 | A1 | 8/2014 | Linguraru et al. |
| 2014/0226896 | A1 | 8/2014 | Imai |
| 2014/0270490 | A1 | 9/2014 | Wus et al. |
| 2014/0304629 | A1 | 10/2014 | Cummins et al. |
| 2014/0323873 | A1 | 10/2014 | Cummins et al. |
| 2014/0334723 | A1 | 11/2014 | Chatow |
| 2015/0045631 | A1 | 2/2015 | Pederson |
| 2015/0099947 | A1 | 4/2015 | Qu |
| 2015/0178554 | A1 | 6/2015 | Kanaujia et al. |
| 2015/0310040 | A1 | 10/2015 | Chan |
| 2015/0339757 | A1 | 11/2015 | Aarabi |
| 2016/0062456 | A1 | 3/2016 | Wang |
| 2016/0162728 | A1 | 6/2016 | Arai et al. |
| 2016/0219217 | A1 | 7/2016 | Williams |
| 2016/0255303 | A1 | 9/2016 | Tokui |
| 2016/0292380 | A1 | 10/2016 | Cho |
| 2016/0314616 | A1 | 10/2016 | Su |
| 2016/0330370 | A1 | 11/2016 | Ghosh |
| 2017/0032178 | A1 | 2/2017 | Henry |
| 2017/0039357 | A1 | 2/2017 | Hwang |
| 2017/0178058 | A1 | 6/2017 | Bhat |
| 2017/0246473 | A1 | 8/2017 | Marinkovich |
| 2017/0270348 | A1 | 9/2017 | Morgana et al. |
| 2017/0270349 | A1 | 9/2017 | Polania Cabrera et al. |
| 2017/0270350 | A1 | 9/2017 | Maltz et al. |
| 2017/0270593 | A1 * | 9/2017 | Sherman ................ G06N 3/082 |
| 2017/0270691 | A1 | 9/2017 | Maltz et al. |
| 2017/0272741 | A1 | 9/2017 | Maltz et al. |
| 2017/0294010 | A1 | 10/2017 | Shen |
| 2017/0308738 | A1 | 10/2017 | Zhang |
| 2018/0276869 | A1 | 9/2018 | Matts |
| 2018/0276883 | A1 | 9/2018 | D'Alessandro |

(56) References Cited

U.S. PATENT DOCUMENTS

2018/0352150 A1 12/2018 Purwar
2019/0035149 A1* 1/2019 Chen .................. G06T 13/40

FOREIGN PATENT DOCUMENTS

| CN | 104504376 A | 4/2015 |
|---|---|---|
| EP | 1297781 A1 | 4/2003 |
| EP | 1030267 B1 | 1/2010 |
| EP | 1813189 B1 | 3/2010 |
| EP | 1189536 B1 | 3/2011 |
| EP | 2728511 A1 | 5/2014 |
| GB | 2424332 A | 9/2006 |
| JP | 2007050158 A | 3/2007 |
| KR | 20140078459 A | 6/2014 |
| WO | WO200076398 A1 | 12/2000 |
| WO | 2003049039 A1 | 6/2003 |
| WO | 2006005917 A1 | 1/2006 |
| WO | 2007044815 A2 | 4/2007 |
| WO | WO2007051299 A1 | 5/2007 |
| WO | WO2008003146 A2 | 1/2008 |
| WO | WO2008086311 A2 | 7/2008 |
| WO | WO2009100494 A1 | 8/2009 |
| WO | WO2011109168 A1 | 9/2011 |
| WO | 2011146321 A2 | 11/2011 |
| WO | 2013104015 A1 | 7/2013 |
| WO | 2014122253 A2 | 8/2014 |
| WO | WO2015017687 A2 | 2/2015 |
| WO | WO201588079 A1 | 6/2015 |
| WO | WO2017029488 A2 | 2/2017 |

OTHER PUBLICATIONS

Jagtap et al., Human Age Classification Using facial Skin Aging Features and Artificial Neural Network, Cognitive Systems Research vol. 40 (2016), pp. 116-128 (Year: 2016) (Year: 2016).*
Y. Fu, G. Guo, and T. S. Huang, "Age synthesis and estimation via faces: A survey," Pattern Analysis and Machine Intelligence, IEEE Transactions on, vol. 32, No. 11, pp. 1955-1976, 2010.
B. Tiddeman, M. Burt, and D. Perrett, "Prototyping and transforming facial textures for perception research," Computer Graphics and Applications, IEEE, vol. 21, No. 5, pp. 42-50, 2001.
D. M. Burt and D. I. Perrett, "Perception of age in adult Caucasian male faces: Computer graphic manipulation of shape and colour information," Proceedings of the Royal Society of London. Series B: Biological Sciences, vol. 259, No. 1355, pp. 137-143, 1995.
A. Lanitis, C. J. Taylor, and T. F. Cootes, "Toward automatic simulation of aging effects on face images," IEEE Transactions on Pattern Analysis and Machine Intelligence, vol. 24, No. 4, pp. 442-455, Apr. 2002.
Z. Liu, Z. Zhang, and Y. Shan, "Image-based surface detail transfer," Computer Graphics and Applications, IEEE, vol. 24, No. 3, pp. 30-35, 2004.
E. Patterson, K. Ricanek, M. Albert, and E. Boone, "Automatic representation of adult aging in facial images," in Proc. IASTED Int'l Conf. Visualization, Imaging, and Image Processing, 2006, pp. 171-176.
T. J. Hutton, B. F. Buxton, P. Hammond, and H. W. Potts, "Estimating average growth trajectories in shape-space using kernel smoothing," Medical Imaging, IEEE Transactions on, vol. 22, No. 6, pp. 747-753, 2003.
D. Dean, M. G. Hans, F. L. Bookstein, and K. Subramanyan, "Three-dimensional Bolton-Brush Growth Study landmark data: ontogeny and sexual dimorphism of the Bolton standards cohort," 2009.
J. H. Langlois and L. A. Roggman, "Attractive faces are only average," Psychological science, vol. 1, No. 2, pp. 115-121, 1990.
Y. H. Kwon and N. da Vitoria Lobo, "Age classification from facial images," in Computer Vision and Pattern Recognition, 1994. Proceedings CVPR'94., 1994 IEEE Computer Society Conference on, 1994, pp. 762-767.

P. A. George and G. J. Hole, "Factors influencing the accuracy of age estimates of unfamiliar faces," Perception—London-, vol. 24, pp. 1059-1059, 1995.
I. Pitanguy, F. Leta, D. Pamplona, and H. I. Weber, "Defining and measuring aging parameters," Applied Mathematics and Computation, vol. 78, No. 2-3, pp. 217-227, Sep. 1996.
Y. Wu, P. Kalra, and N. M. Thalmann, "Simulation of static and dynamic wrinkles of skin," in Computer Animation'96. Proceedings, 1996, pp. 90-97.
P. N. Belhumeur, J. P. Hespanha, and D. Kriegman, "Eigenfaces vs. fisherfaces: Recognition using class specific linear projection," Pattern Analysis and Machine Intelligence, IEEE Transactions on, vol. 19, No. 7, pp. 711-720, 1997.
M. J. Jones and T. Poggio, "Multidimensional morphable models," in Computer Vision, 1998. Sixth International Conference on, 1998, pp. 683-688.
I. Pitanguy, D. Pamplona, H. I. Weber, F. Leta, F. Salgado, and H. N. Radwanski, "Numerical modeling of facial aging," Plastic and reconstructive surgery, vol. 102, No. 1, pp. 200-204, 1998.
V. Blanz and T. Vetter, "A morphable model for the synthesis of 3D faces," in Proceedings of the 26th annual conference on Computer graphics and interactive techniques, 1999, pp. 187-194.
L. Boissieux, G. Kiss, N. M. Thalmann, and P. Kalra, Simulation of skin aging and wrinkles with cosmetics insight. Springer, 2000.
T. F. Cootes, G. J. Edwards, and C. J. Taylor, "Active appearance models," IEEE Transactions on pattern analysis and machine intelligence, vol. 23, No. 6, pp. 681-685, 2001.
Y. Bando, T. Kuratate, and T. Nishita, "A simple method for modeling wrinkles on human skin," in Computer Graphics and Applications, 2002. Proceedings. 10th Pacific Conference on, 2002, pp. 166-175.
M. R. Gandhi, "A method for automatic synthesis of aged human facial images," McGill University, 2004.
A. Lanitis, C. Draganova, and C. Christodoulou, "Comparing different classifiers for automatic age estimation," Systems, Man, and Cybernetics, Part B: Cybernetics, IEEE Transactions on, vol. 34, No. 1, pp. 621-628, 2004.
S. R. Coleman and R. Grover, "The anatomy of the aging face: volume loss and changes in 3-dimensional topography," Aesthetic surgery journal, vol. 26, No. 1 suppl, pp. S4-S9, 2006.
Y. Fu and N. Zheng, "M-face: An appearance-based photorealistic model for multiple facial attributes rendering," Circuits and Systems for Video Technology, IEEE Transactions on, vol. 16, No. 7, pp. 830-842, 2006.
X. Geng, Z.-H. Zhou, Y. Zhang, G. Li, and H. Dai, "Learning from facial aging patterns for automatic age estimation," in Proceedings of the 14th annual ACM international conference on Multimedia, 2006, pp. 307-316.
N. Ramanathan and R. Chellappa, "Modeling age progression in young faces," in Computer Vision and Pattern Recognition, 2006 IEEE Computer Society Conference on, 2006, vol. 1, pp. 387-394.
C. J. Solomon, S. J. Gibson, and others, "A person-specific, rigorous aging model of the human face," Pattern Recognition Letters, vol. 27, No. 15, pp. 1776-1787, 2006.
K. Ueki, T. Hayashida, and T. Kobayashi, "Subspace-based agegroup classification using facial images under various lighting conditions," in Automatic Face and Gesture Recognition, 2006. FGR 2006. 7th International Conference on, 2006, p. 6-pp.
A. M. Albert, K. Ricanek Jr, and E. Patterson, "A review of the literature on the aging adult skull and face: Implications for forensic science research and applications," Forensic Science International, vol. 172, No. 1, pp. 1-9, 2007.
X. Geng, Z.-H. Zhou, and K. Smith-Miles, "Automatic age estimation based on facial aging patterns," Pattern Analysis and Machine Intelligence, IEEE Transactions on, vol. 29, No. 12, pp. 2234-2240, 2007.
K. Scherbaum, M. Sunkel, H.-P. Seidel, and V. Blanz, "Prediction of Individual Non-Linear Aging Trajectories of Faces," in Computer Graphics Forum, 2007, vol. 26, pp. 285-294.
J. Suo, F. Min, S. Zhu, S. Shan, and X. Chen, "A multi-resolution dynamic model for face aging simulation," in Computer Vision and Pattern Recognition, 2007. CVPR'07. IEEE Conference on, 2007, pp. 1-8.

(56) References Cited

OTHER PUBLICATIONS

Y. Fu and T. S. Huang, "Human age estimation with regression on discriminative aging manifold," Multimedia, IEEE Transactions on, vol. 10, No. 4, pp. 578-584, 2008.
G. Guo, Y. Fu, C. R. Dyer, and T. S. Huang, "Image-based human age estimation by manifold learning and locally adjusted robust regression," Image Processing, IEEE Transactions on, vol. 17, No. 7, pp. 1178-1188, 2008.
F. Jiang and Y. Wang, "Facial aging simulation based on super-resolution in tensor space," in Image Processing, 2008. ICIP 2008. 15th IEEE International Conference on, 2008, pp. 1648-1651.
U. Park, Y. Tong, and A. K. Jain, "Face recognition with temporal invariance: A 3d aging model," in Automatic Face & Gesture Recognition, 2008. FG'08. 8th IEEE International Conference on, 2008, pp. 1-7.
N. Ramanathan and R. Chellappa, "Modeling shape and textural variations in aging faces," in Automatic Face & Gesture Recognition, 2008. FG'08. 8th IEEE International Conference on, 2008, pp. 1-8.
B. Guyuron, D. J. Rowe, A. B. Weinfeld, Y. Eshraghi, A. Fathi, and S. Iamphongsai, "Factors contributing to the facial aging of identical twins," Plastic and reconstructive surgery, vol. 123, No. 4, pp. 1321-1331, 2009.
G. Mu, G. Guo, Y. Fu, and T. S. Huang, "Human age estimation using bio-inspired features," in Computer Vision and Pattern Recognition, 2009. CVPR 2009. IEEE Conference on, 2009, pp. 112-119.
N. Ramanathan, R. Chellappa, and S. Biswas, "Computational methods for modeling facial aging: A survey," Journal of Visual Languages & Computing, vol. 20, No. 3, pp. 131-144, 2009.
U. Park, Y. Tong, and A. K. Jain, "Age-invariant face recognition," Pattern Analysis and Machine Intelligence, IEEE Transactions on, vol. 32, No. 5, pp. 947-954, 2010.
J. Suo, S.-C. Zhu, S. Shan, and X. Chen, "A compositional and dynamic model for face aging," Pattern Analysis and Machine Intelligence, IEEE Transactions on, vol. 32, No. 3, pp. 385-401, 2010.
K. Sveikata, I. Balciuniene, and J. Tutkuviene, "Factors influencing face aging. Literature review," Stomatologija, vol. 13, No. 4, pp. 113-115, 2011.
J. P. Farkas, J. E. Pessa, B. Hubbard, and R. J. Rohrich, "The science and theory behind facial aging," Plastic and Reconstructive Surgery—Global Open, vol. 1, No. 1, pp. e8-e15, 2013.
J. Gatherwright, M. T. Liu, B. Amirlak, C. Gliniak, A. Totonchi, and B. Guyuron, "The Contribution of Endogenous and Exogenous Factors to Male Alopecia: A Study of Identical Twins," Plastic and reconstructive surgery, vol. 131, No. 5, p. 794e-801e, 2013.
U.S. Appl. No. 62/547,196, filed Aug. 18, 2017, Ankur (NMN) Purwar.
All Office Actions, U.S. Appl. No. 15/414,002.
All Office Actions, U.S. Appl. No. 15/414,095.
All Office Actions, U.S. Appl. No. 15/414,147.
All Office Actions, U.S. Appl. No. 15/414,189.
All Office Actions, U.S. Appl. No. 15/414,305.
All Office Actions, U.S. Appl. No. 15/465,166.
All Office Actions, U.S. Appl. No. 15/993,950.
All Office Actions, U.S. Appl. No. 15/993,973.
Andreas Lanitis, Comparative Evaluation of Automatic Age-Progression Methodologies, EURASIP Journal on Advances in Signal Processing, vol. 2008, No. 1, Jan. 1, 2008, 10 pages.
Beauty.AI Press Release, PRWeb Online Visibility from Vocus, Nov. 19, 2015, 3 pages.
Chen et al., Face Image Quality Assessment Based on Learning to Rank, IEEE Signal Processing Letters, vol. 22, No. 1 (2015), pp. 90-94.
Crete et al., The blur effect: perception and estimation with a new no-reference perceptual blur metric, Proc. SPIE 6492, Human Vision and Electronic Imaging XII, 2007, 12 pages.
Dong et al., Automatic age estimation based on deep learning algorithm, Neurocomputing 187 (2016), pp. 4-10.
Finlayson et al., Color by Correlation: A Simple, Unifying Framework for Color Constancy, IEEE Transactions on Pattern Analysis and Machine Intelligence, vol. 23, No. 11, Nov. 2001, pp. 1209-1221.
Fu et al., Learning Race from Face: A Survey, IEEE Transactions on Pattern Analysis and Machine Intelligence, vol. 36, No. 12, Dec. 1, 2014, pp. 2483-2509.
Gong et al., Quantification of Pigmentation in Human Skin Images, IEEE, 2012, pp. 2853-2856.
Gray et al., Predicting Facial Beauty without Landmarks, European Conference on Computer Vision, Computer Vision—ECCV 2010, 14 pages.
Guodong Guo et al., A framework for joint estimation of age, gender and ethnicity on a large database, Image and Vision Computing, vol. 32, No. 10, May 10, 2014, pp. 761-770.
Huerta et al., A deep analysis on age estimation, Pattern Recognition Letters 68 (2015), pp. 239-249.
Hyvarinen et al., A Fast Fixed-Point Algorithm for Independent Component Analysis of Complex Valued Signals, Neural Networks Research Centre, Helsinki University of Technology, Jan. 2000, 15 pages.
Hyvarinen et al., A Fast Fixed-Point Algorithm for Independent Component Analysis, Neural Computation, 9:1483-1492, 1997.
International Search Report and Written Opinion of the International Searching Authority, PCT/US2017/023334, dated May 15, 2017, 12 pages.
International Search Report and Written Opinion of the International Searching Authority, PCT/US2018/023042, dated Jun. 6, 2018.
International Search Report and Written Opinion of the International Searching Authority, PCT/US2018/023219, dated Jun. 1, 2018, 13 pages.
International Search Report and Written Opinion of the International Searching Authority, PCT/US2018/035291, dated Aug. 30, 2018, 11 pages.
International Search Report and Written Opinion of the International Searching Authority, PCT/US2018/035296, dated Oct. 17, 2018, 17 pages.
Jagtap et al., Human Age Classification Using Facial Skin Aging Features and Artificial Neural Network, Cognitive Systems Research vol. 40 (2016), pp. 116-128.
Konig et al., A New Context: Screen to Face Distance, 8th International Symposium on Medical Information and Communication Technology (ISMICT), IEEE, Apr. 2, 2014, pp. 1-5.
Krizhevsky et al., ImageNet Classification with Deep Convolutional Neural Networks, part of Advances in Neural Information Processing Systems 25 (NIPS 2012), 9 pages.
Levi et al., Age and Gender Classification Using Convolutional Neural Networks, IEEE Conference on Computer Vision and Pattern Recognition (CVPR) Workshops, 2015, pp. 34-42.
Mathias et al., Face Detection Without Bells and Whistles, European Conference on Computer Vision, 2014, pp. 720-735.
Ojima et al., Application of Image-Based Skin Chromophore Analysis to Cosmetics, Journal of Imaging Science and Technology, vol. 48, No. 3, May 2004, pp. 222-226.
Sun et al., Statistical Characterization of Face Spectral Reflectances and Its Application to Human Portraiture Spectral Estimation, Journal of Imaging Science and Technology, vol. 46, No. 6, 2002, pp. 498-506.
Sung Eun Choi et al., Age face simulation using aging functions on global and local features with residual images, Expert Systems with Applications, vol. 80, Mar. 7, 2017, pp. 107-125.
Tsumura et al., Image-based skin color and texture analysis/synthesis by extracting hemoglobin and melanin information in the skin, ACM Transactions on Graphics (TOG), vol. 22, Issue 3, Jul. 2003, pp. 770-779.
Viola et al., Robust Real-Time Face Detection, International Journal of Computer Vision 57(2), 2004, pp. 137-154.
Wang et al., Combining Tensor Space Analysis and Active Appearance Models for Aging Effect Simulation on Face Images, IEEE Transactions on Systems, Man, and Cybernetics—Part B: Cybernetics, vol. 42, No. 4, Aug. 1, 2012, pp. 1107-1118.

(56) References Cited

OTHER PUBLICATIONS

Wang et al., Deeply-Learned Feature for Age Estimation, 2015 IEEE Winter Conference on Applications of Computer Vision, pp. 534-541.
Wu et al., Funnel-Structured Cascade for Multi-View Face Detection with Alignment-Awareness, Neurocomputing 221 (2017), pp. 138-145.
Xiangbo Shu et al., Age progression: Current technologies and applications, Neurocomputing, vol. 208, Oct. 1, 2016, pp. 249-261.
Yi et al., Age Estimation by Multi-scale Convolutional Network, Computer Vision—ACCV 2014, Nov. 1, 2014, pp. 144-158, 2015.
Yun Fu et al., Age Synthesis and Estimation via Faces: A Survey, IEEE Transactions on Pattern Analysis and Machine Intelligence, vol. 32, No. 11, Nov. 1, 2010, pp. 1955-1976.

* cited by examiner

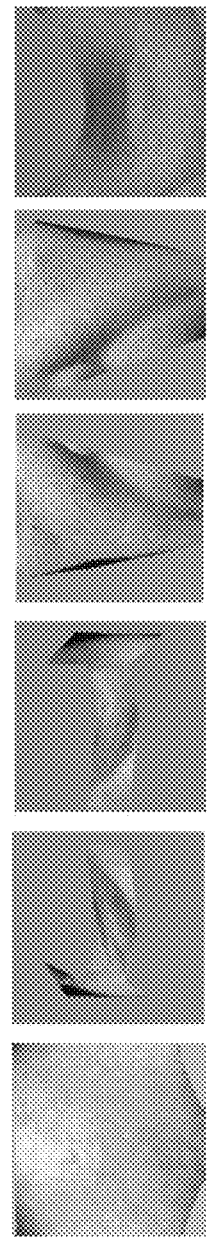
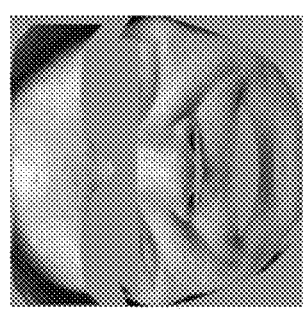
FIG. 4A, FIG. 4B, FIG. 4C, FIG. 4D, FIG. 4E, FIG. 4F, FIG. 4G
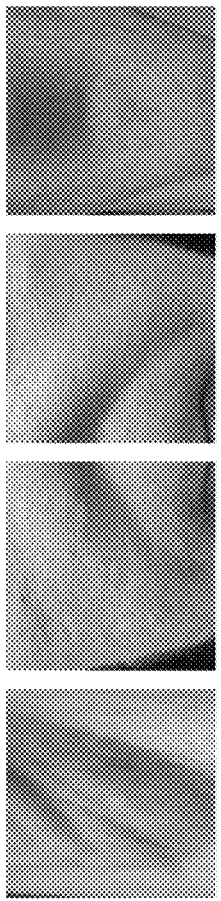
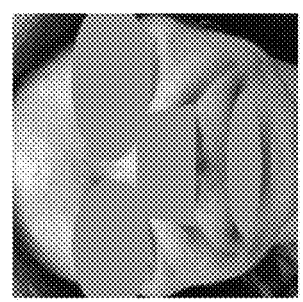
FIG. 5A, FIG. 5B, FIG. 5C, FIG. 5D, FIG. 5E, FIG. 5F, FIG. 5G
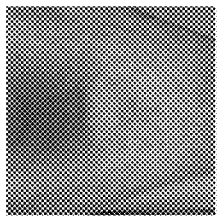
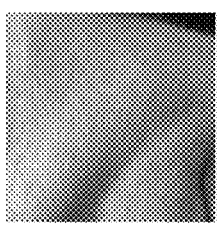
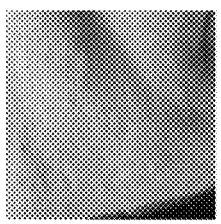
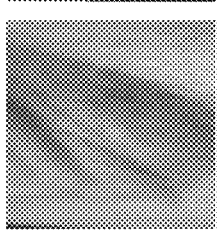
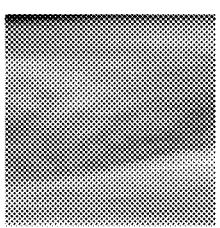
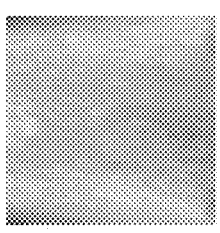
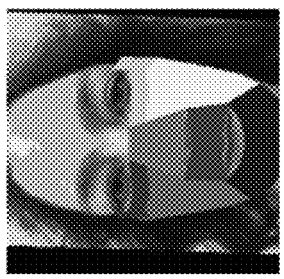
FIG. 6A, FIG. 6B, FIG. 6C, FIG. 6D, FIG. 6E, FIG. 6F, FIG. 6G

SYSTEMS AND METHODS FOR DETERMINING APPARENT SKIN AGE

FIELD

The present application relates generally to systems and methods for determining the apparent age of a person's skin. More specifically, the present application relates to the use of image processing techniques and one or more convolutional neural networks to more accurately determine the age of a consumer's skin.

BACKGROUND

Skin is the first line of defense against environmental insults that would otherwise damage sensitive underlying tissue and organs. Additionally, skin plays a key role in the physical appearance of a person. Generally, most people desire younger, healthy looking skin. And to some, the tell-tale signs of skin aging such as thinning skin, wrinkles, and age spots are an undesirable reminder of the disappearance of youth. As a result, treating the signs of skin aging has become a booming business in youth-conscious societies. Treatments range from cosmetic creams and moisturizers to various forms of cosmetic surgery.

While a wide variety of cosmetic skin care products are marketed for treating skin conditions, it is not uncommon for a consumer to have difficulty determining which skin care product they should use. For example, someone with skin that appears older than their chronological age may require a different product or regimen compared to someone with more youthful looking skin. Thus, it would be desirable to accurately determine the apparent age of a person's skin.

Numerous attempts have been made to determine a person's apparent skin age by analyzing an image of the person (e.g., a "selfie") using a computer model/algorithm. The results provided by the computer model can then be used to provide a consumer with a skin profile (e.g., skin age, moisture level, or oiliness) and/or a product recommendation. Past attempts at modeling skin age have relied on facial macro features (eyes, ears, nose, mouth, etc.) as a primary factor driving the computer model/prediction. However, macro-feature based systems may not adequately utilize other skin appearance cues (e.g., micro features such as fine lines, wrinkles, and pigmentation conditions) that drive age perception for a consumer, which can lead to a poor prediction of apparent skin age.

Other past attempts to model skin age and/or skin conditions utilized cumbersome equipment or techniques (e.g., stationary cameras, microscopes, cross-polarized light, specular reflectance, and/or spatial frequency analysis). Thus, it would be desirable to provide consumers with a convenient to use and/or mobile system that analyzes skin such that the consumer can receive product and/or skin care regimen recommendations.

Accordingly, there is still a need for an improved method of conveniently determining the apparent age of a person's skin, which can then be used to help provide a customized skin care product or regimen recommendation.

SUMMARY

Disclosed herein are systems and methods for determining an apparent skin age of a person and providing customized skin care product recommendations to a user. The systems and methods utilize a computing device to process an image of a person, which depicts the person's face, and then analyze the processed image. During processing, the face of the person is identified in the image and facial macro features are masked. The processed image is analyzed. Determining the apparent skin age may include identifying at least one pixel that is indicative of skin age and utilizing the at least one pixel to provide the apparent skin age. Based on the analysis by the CNN and, optionally, other data provided by a user, the system can determine an apparent skin age of a person and/or provide a skin care product or skin care regimen for the person.

BRIEF DESCRIPTION OF THE DRAWINGS

FIGS. 4A to 4G depict masked macro features.
FIGS. 5A to 5G depict masked macro features.
FIGS. 6A to 6G depict regions of interest.

DETAILED DESCRIPTION

Figure 1:
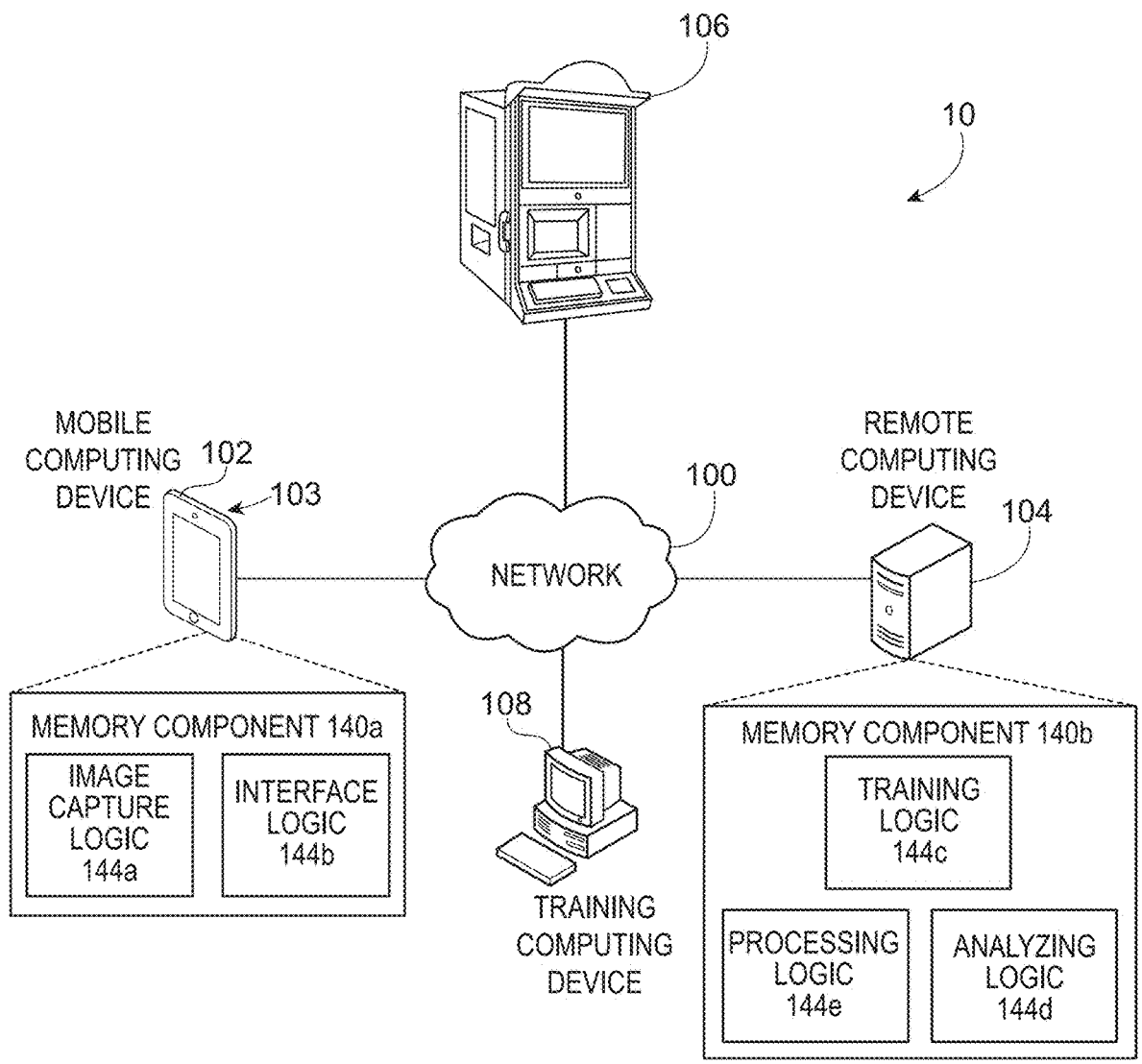
FIG. 1 depicts an example of the present system.

A variety of systems and methods have been used in the cosmetics industry to provide customized product recommendations to consumers. For example, some well-known systems use a macro feature-based analysis in which one or more macro features commonly visible in a photograph of a person's face (e.g., eyes, ears, nose, mouth, and/or hair) are detected in a captured image such as a digital photograph or "selfie" and compared to a predefined definition. However, macro-feature based analysis systems may not provide a suitably accurate indication of apparent skin age. Conventional micro feature based systems can employ cumbersome equipment or techniques, which may not be suitable for use by the average consumer.

It has now been discovered that masking facial macro-features and analyzing facial micro-features with a convolutional neural network ("CNN") can provide a suitably accurate determination of a person's apparent skin age. The CNN based image analysis system can be configured to use relatively little image pre-processing, which reduces the dependence of the system on prior knowledge and predetermined definitions and reduces the computer memory and/or processing power needed to analyze an image. Consequently, the present system demonstrates improved generalization compared to a conventional macro-feature-based image analysis systems, which may lead to a better skin care product or regimen recommendations for a consumer who uses the system.

Definitions

"About," as used herein, modifies a particular value, by referring to a range equal to the particular value, plus or minus twenty percent (+/−20%) or less (e.g., less than 15%, 10%, or even less than 5%).

"Apparent skin age" means the age of a person's skin calculated by the system herein, based on a captured image.

"Convolutional neural network" is a type of feed-forward artificial neural network where the individual neurons are tiled in such a way that they respond to overlapping regions in the visual field.

"Coupled," when referring to various components of the system herein, means that the components are in electrical, electronic, and/or mechanical communication with one another.

"Disposed" means an element is positioned in a particular place relative to another element.

"Image capture device" means a device such as a digital camera capable of capturing an image of a person.

"Joined" means configurations whereby an element is directly secured to another element by affixing the element directly to the other element, and configurations whereby an element is indirectly secured to another element by affixing the element to intermediate member(s) that in turn are affixed to the other element.

"Macro features" are relatively large bodily features found on or near the face of a human. Macro features include, without limitation, face shape, ears, eyes, mouth, nose, hair, and eyebrows.

"Masking" refers the process of digitally replacing at least some of the pixels disposed in and/or proximate to a macro feature in an image with pixels that have an RGB value closer to or the same as pixels disposed in a region of interest.

"Micro features" are relatively small features commonly associated with aging skin and/or skin disorders found on the face of a human. Micro features include, without limitation, fine line, wrinkles, dry skin features (e.g., skin flakes), and pigmentation disorders (e.g., hyperpigmentation conditions). Micro features do not include macro features.

"Person" means a human being.

"Region of interest" or "RoI" means a specifically bounded portion of skin in an image or image segment where analysis by a CNN is desired to provide an apparent skin age. Some nonlimiting examples of a region of interest include a portion of an image depicting the forehead, cheek, nasolabial fold, under-eye area, or chin in which the macro features have been masked.

"Segmenting" refers to dividing an image into two or more discrete zones for analysis.

"Target skin age" means a skin age that is a predetermined number of years different from the apparent skin age.

"User" herein refers to a person who uses at least the features provided herein, including, for example, a device user, a product user, a system user, and the like.

The systems and methods herein utilize a multi-step (e.g., 2, 3, 4, or more steps) approach to determine the apparent skin age of a person from an image of that person. By using a multi-step process instead of a single-step process, in which the CNN processes and analyzes the image or analyzes a full-face image, the CNN can focus on the important features that drive age perception (e.g., micro features) and reduce the computing power needed to analyze the image and reduce the bias that may be introduced to the system by macro features.

In a first step, processing logic stored in a memory component of the system causes the system to perform one or more (e.g., all) of the following: identify a face in the image for analysis, normalize the image, mask one or more (e.g., all) facial macro-features on the identified face, and segment the image for analysis. The processing steps may be performed in any order, as desired. The processed image is provided to a convolutional neural network as one or more input variants for analysis. The results of the CNN analysis are used to provide an apparent skin age of each segment and/or an overall skin age for the entire face.

FIG. 1 depicts an exemplary system 10 for capturing an image of a person, analyzing the image, determining the skin age of the person, and, optionally, providing a customized skin care regimen and/or product recommendation to a user. The system 10 may include a network 100 (e.g., a wide area network such as a mobile telephone network, a public switched telephone network, a satellite network, and/or the internet; a local area network such as wireless-fidelity, Wi-Max, ZigBee™, and/or Bluetooth™; and/or other suitable forms of networking capabilities). Coupled to the network 100 are a mobile computing device 102, a remote computing device 104, and a training computing device 108.

The mobile computing device 102 may be a mobile telephone, a tablet, a laptop, a personal digital assistant and/or other computing device configured for capturing, storing, and/or transferring an image such as a digital photograph. Accordingly, the mobile computing device 102 may include an image capture device 103 such as a digital camera and/or may be configured to receive images from other devices. The mobile computing device 102 may include a memory component 140*a*, which stores image capture logic 144*a* and interface logic 144*b*. The memory component 140*a* may include random access memory (such as SRAM, DRAM, etc.), read only memory (ROM), registers, and/or other forms of computing storage hardware. The image capture logic 144*a* and the interface logic 144*b* may include software components, hardware circuitry, firmware, and/or other computing infrastructure. The image capture logic 144*a* may facilitate capturing, storing, preprocessing, analyzing, transferring, and/or performing other functions on a digital image of a user. The interface logic 144*b* may be configured for providing one or more user interfaces to the user, which may include questions, options, and the like. The mobile computing device 102 may also be configured for communicating with other computing devices via the network 100.

The remote computing device 104 may also be coupled to the network 100 and may be configured as a server (or plurality of servers), personal computer, mobile computer, and/or other computing device configured for creating, storing, and/or training a convolutional neural network capable of determining the skin age of a user by locating and analyzing skin features that contribute to skin age in a captured image of the user's face. For example, the CNN may be stored as logic 144*c* and 144*d* in the memory component 140*b* of a remote computing device 104. Commonly perceived skin flaws such as fine lines, wrinkles, dark (age) spots, uneven skin tone, blotchiness, enlarged pores, redness, yellowness, combinations of these and the like may all be identified by the trained CNN as contributing to the skin age of the user.

The remote computing device 104 may include a memory component 140*b* that stores training logic 144*c*, analyzing logic 144*d*, and/or processing logic 144*e*. The memory component 140*b* may include random access memory (such as SRAM, DRAM, etc.), read only memory (ROM), registers, and/or other forms of computing storage hardware. The training logic 144*c*, analyzing logic 144*d*, and/or processing logic 144*e* may include software components, hardware circuitry, firmware, and/or other computing infrastructure. Training logic 144*c* facilitates creation and/or training of the CNN, and thus may facilitate creation of and/or operation of the CNN. Processing logic 144*e* causes the image received from the mobile computing device 102 (or other computing device) to be processed for analysis by the analyzing logic 144d. Image processing may include macro feature identification, masking, segmentation, and/or other image alteration processes, which are described in more detail below. Analyzing logic 144d causes the remote computing device 104 to analyze the processed image to provide an apparent skin age, product recommendation, etc.

In some instances, a training computing device 108 may be coupled to the network 100 to facilitate training of the CNN. For example, a trainer may provide one or more digital images of a face or skin to the CNN via the training computing device 108. The trainer may also provide information and other instructions (e.g., actual age) to inform the CNN which assessments are correct and which assessments are not correct. Based on the input from the trainer, the CNN may automatically adapt, as described in more detail below.

The system 10 may also include a kiosk computing device 106, which may operate similar to the mobile computing device 102, but may also be able to dispense one or more products and/or receive payment in the form of cash or electronic transactions. Of course, it is to be appreciated that a mobile computing device 102, which also provides payment and/or production dispensing, is contemplated herein. In some instances, the kiosk computing device 106 and/or mobile computing device 102 may also be configured to facilitate training of the CNN. Thus, the hardware and software depicted and/or described for the mobile computing device 102 and the remote computing device 104 may be included in the kiosk computing device 106, the training computing device 108, and/or other devices. Similarly, the hardware and software depicted and/or described for the remote computing device 2104 in FIG. 21 may be included in one or more of the mobile computing device 102, the remote computing device 104, the kiosk computing device 106, and the training computing device 108.

It should also be understood that while the remote computing device 104 is depicted in FIG. 1 as performing the image processing and image analysis, this is merely an example. The image processing and/or image analysis may be performed by any suitable computing device, as desired.

Image Processing

In a first step of the image analysis process herein, the present system receives an image containing at least one face of person and prepares the image for analysis by the CNN. The image may be received from any suitable source, such as, for example, a smartphone comprising a digital camera. It may be desirable to use a camera capable of producing at least a one megapixel image and electronically transferring the image to a computing device(s) that can access suitable image processing logic and/or image analyzing logic.

Once the image is received, the processing logic identifies the portion(s) of the image that contain a human face. The processing logic can be configured to detect the human face(s) present in the image using any suitable technique known in the art, such as, for example, color and/or color contrast techniques, removal of monochrome background features, edge-based techniques that use geometric models or Hausdorff distance, weak cascade techniques, or a combination of these. In some instances, it may be particularly desirable to use a Viola-Jones type of weak cascade technique, which was described by Paul Viola and Michael Jones in "International Journal of Computer Vision" 57(2), 137-154, 2004.

In some instances, an image received by the present system may contain more than one face, but a user may not want to analyze all of the faces in the image. For example, the user may only want to analyze the face of the person seeking advice related to a skin care treatment and/or product. Thus, the present system may be configured to select only the desired image(s) for analysis. For example, the processing logic may select the dominant face for analysis based on the relative position of the face in the image (e.g., center), the relative size of face (e.g., largest "rectangle"), or a combination of these. Alternatively or additionally, the present system may query the user to confirm that the face selected by the processing logic is correct and/or ask the user to select one or more faces for analysis. Any suitable user interface technique known in the art may be used to query a user and/or enable the user to select one or more faces present in the image.

Once the appropriate face(s) is selected for further processing, the processing logic detects one or more facial landmarks (e.g., eyes, nose, mouth, or portions thereof), which may be used as anchor features (i.e., reference points that the processing logic can use to normalize and/or segment the image). In some instances, the processing logic may create a bounding box that isolates the face from the rest of the image. In this way, background objects, undesirable macro features, and/or other body parts that are visible in the image can be removed. The facial landmarks of interest may be detected using a known landmark detection technique (e.g., Viola-Jones or a facial shape/size recognition algorithm).

Figure 2:
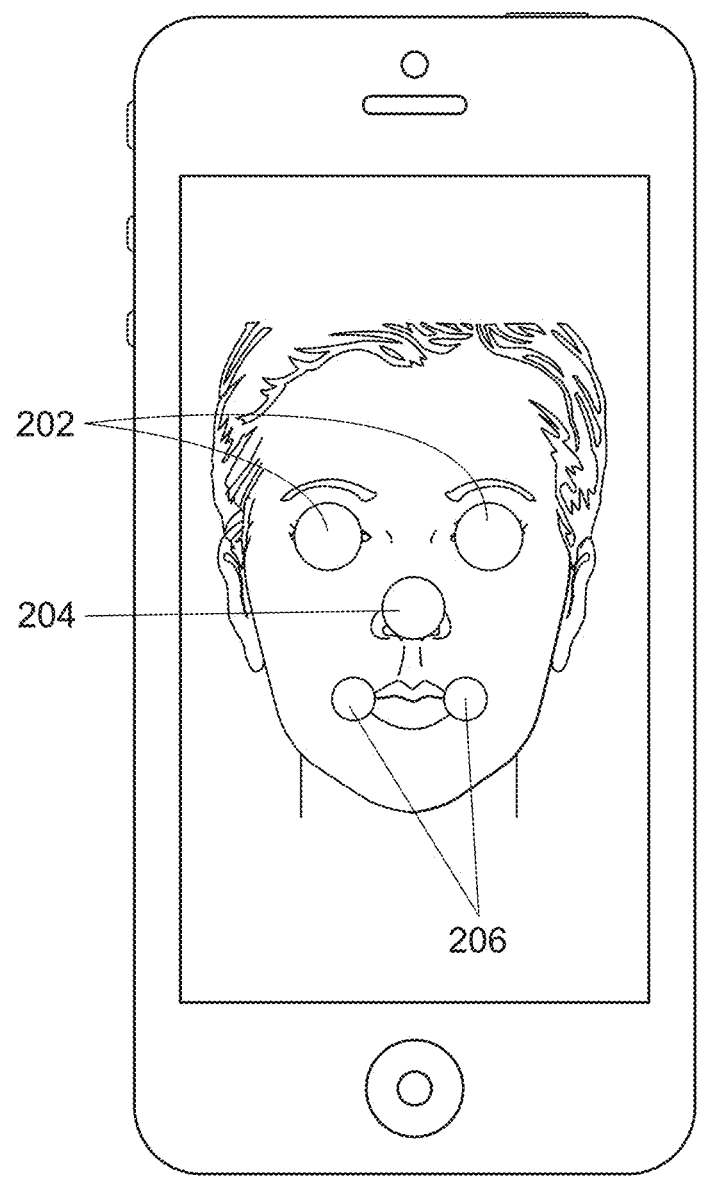
FIG. 2 depicts macro features identified in an image of a person.

FIG. 2 illustrates an example of a landmark detection technique in which the eyes 202, nose 204, and corners of the mouth 206 are identified by the processing logic for use as anchor features. In this example, normalizing the image may include rotating the image and/or scaling the size of the image to reduce variability between images.

Figure 3A:
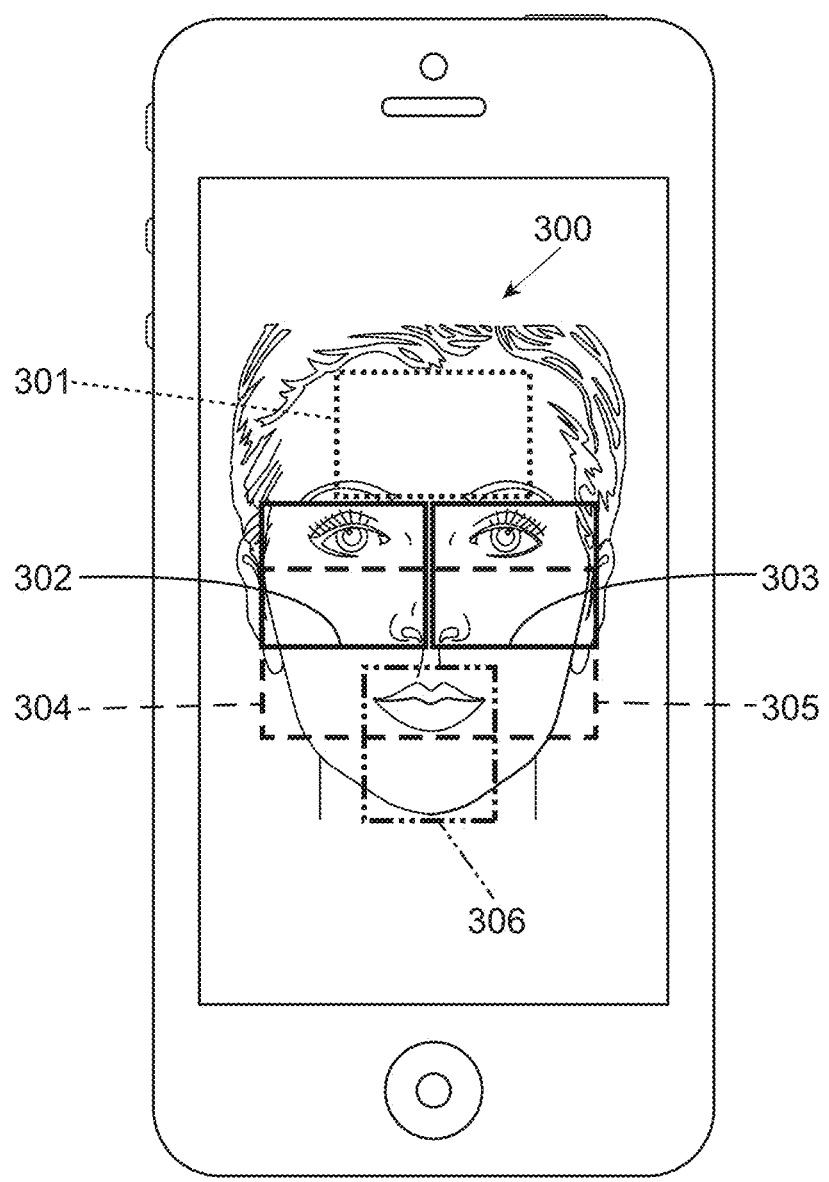
FIG. 3A depicts a segmented image.

FIG. 3A illustrates an example of segmenting an image 300 into discrete zones for subsequent processing and/or analysis. In some instances, the segmented image 300 may be presented to a user via the mobile computing device, as illustrated in FIG. 3A. However, in some instances, the segmented image may just be part of the image processing and not displayed to a user. As illustrated in FIG. 3A, the image is separated into 6 segments that include a forehead segment 301, a left and a right eye segment 302 and 303, a left and a right cheek/nasolabial fold segment 304 and 305, and a chin segment 306. In some instances, the image may be segmented and/or two or more segments combined to reflect zones that are commonly used to analyze skin in the cosmetics industry, such as, for example, the so-called T-zone or U-zone. The T-zone is generally recognized in the cosmetics industry as the portion of the face that extends laterally across the forehead and longitudinally from about the middle of the forehead to the end of the nose or to the bottom of the chin. The T-zone is so named because it resembles an upper-case letter T. The U-zone is generally recognized as the portion of the face that extends longitudinally down one cheek, laterally across the chin, and then back up (longitudinally) to the other cheek. The U-zone is so named because it resembles the letter U.

Facial segmentation may be performed, for example, by a tasks constrained deep convolutional network (TCDCN) or other suitable technique, as known to those skilled in the art. Segmenting the facial image allows the analyzing logic to provide an apparent age for each segment, which can be important because some segments are known to impact overall skin age perception more than other segments. Thus, each segment may be weighted to reflect the influence that segment has on the perception of skin age. In some instances, the processing logic may cause the system to scale the segmented image such that the full height of the facial image (i.e., distance from the bottom of the chin to the top of the forehead) does not exceed a particular value (e.g., between 700 and 800 pixels, between 700 and 750 pixels, or even about 716 pixels).

Figure 3B:
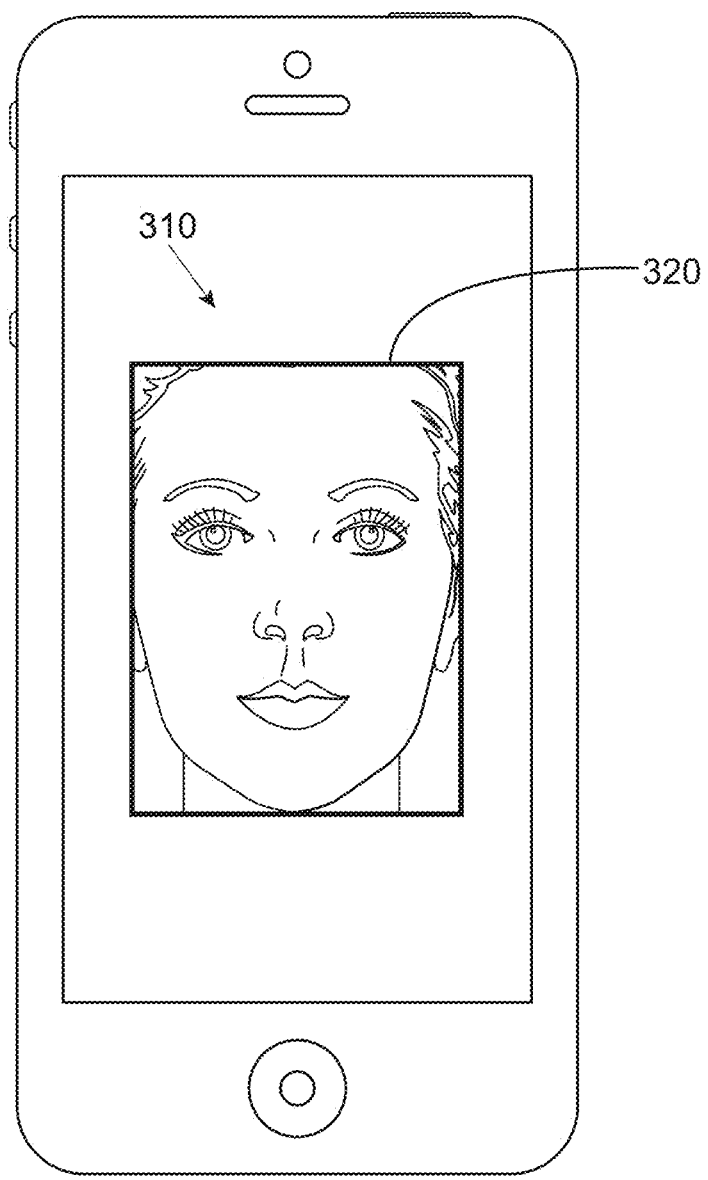
FIG. 3B depicts a bounded image.

FIG. 3B illustrates an example of bounding an image 310 in a bounding box 320. The bounding box 320 may extend longitudinally from the bottom of the chin to the top of the forehead, and laterally from one temple to the other temple. The bounding box 320 may be sized to remove background objects, macro features or a portion thereof (e.g., hair, ears), and/or all or a portion of other bodily objects that may be present in the image (e.g., neck, chest, shoulders, arms, or forehead). Of course, bounding boxes of all sizes are contemplated herein. Bounding may occur before, after, or at the same time as image segmentation. In some instances, the bounding box 320 and/or bounded image 310 may be presented to a user via the mobile computing device, as illustrated in FIG. 3B, but need not necessarily be so.

It is important to prevent facial macro features from contaminating the skin age analysis by the CNN. If the facial macro features are not masked, the CNN may learn to predict the skin age of a person from macro feature cues rather than micro features cues such as fine lines and wrinkles, which are known to be much more influential on how people perceive skin age. This can be demonstrated by digitally altering an image to remove facial micro features such as fine lines, wrinkles, and pigmentation disorders, and observing that the apparent age provided by the system does not change. Masking may occur before and/or after the image is segmented and/or bounded. In the present system, masking may be accomplished by replacing the pixels in a facial macro feature with pixels that have a uniform, non-zero (i.e., black), non-255 (i.e., white) RGB value. For example, it may be desirable to replace the pixels in the macro feature with pixels that have a median RGB value of the skin in the region of interest. It is believed, without being limited by theory, that by masking the facial macro features with uniformly colored pixels or otherwise nondescript pixels, the CNN will learn to predict age using features other than the macro features (e.g., facial micro features such fine lines and wrinkles). Masking herein may be accomplished using any suitable masking means known in the art, such as, for example, Matlab® brand computer software.

Even when masking the facial macro features as described above, a sophisticated convolutional neural network may still learn to predict skin age based on "phantom" macro features. In other words, the neural network may still learn to recognize differences in the patterns of median RGB pixels because the patterns generally correspond to the size and/or position of the masked facial macro feature. The CNN may then apply the pattern differences to its age prediction analysis. To avoid this problem, it is important to use more than one input variant (e.g., 2, 3, 4, 5, or 6, or more) of the processed image to the CNN. By varying how the masked macro features are presented to the CNN, it is believed, without being limited by theory, that the CNN is less likely to learn to use differences in the median RGB pixel patterns to predict skin age.

FIGS. 4A to 4G illustrate an example of a first input variant in which an image of the face is segmented into six discrete zones and then the macro features in each segment are masked to provide the desired region of interest. In this example, the processing logic causes all pixels associated with a macro feature (e.g., eye, nose, mouth, ear, eyebrow, hair) in the image segment to be filled in with the median RGB color space value of all pixels located in the relevant region of interest (e.g., a portion of the image that does not include a macro feature). FIG. 4B illustrates how the eyes and/or eyebrows are masked in a forehead segment to provide a forehead RoI. FIGS. 4C and 4D illustrate how the eyes, eyebrows, nose, cheeks, and hair are masked in an under-eye segment to provide an under-eye RoI. FIGS. 4E and 4F illustrate how the nose, mouth, and hair are masked in a cheek/nasolabial fold segment to provide a cheek/nasolabial fold RoI. FIG. 4G illustrates how the mouth is masked in a chin segment to provide a chin RoI. FIG. 4A illustrates how the masked features would appear on an image of the entire face when the individually masked segments are combined and the background features are removed by a bounding box.

FIGS. 5A to 5G illustrate an example of a second input variant. In this example, the processing logic causes all pixels associated with a macro feature in the unsegmented image of the face ("full-face") to be filled in with the median RGB value of all pixels disposed in a region of interest. The processing logic may then cause the masked, full-face image to be segmented, e.g., as described above. FIG. 5A illustrates a full-face image in which certain macro features are masked and the background features are removed by a bounding box. FIGS. 5B to 5G illustrate how each region of interest appears when the masked, full-face image of FIG. 5A is segmented. When FIGS. 4A to 4G are compared to their counterparts in FIGS. 5A to 5G, both the full-face images and the individual regions of interest differ somewhat from one another.

FIGS. 6A to 6G illustrate an example of a third input variant. In this example, the processing logic causes the system to identify regions of interest in the full-face image, and then segment the image into six discrete zones comprising the regions of interest. FIG. 6A illustrates a full-face image in which the nose is used as an anchor feature and the six image segments are identified. FIGS. 6B-6G illustrate a region of interest extracted from each image segment. FIG. 6B depicts a forehead RoI; FIGS. 6C and 6D each depict an under-eye RoI; FIGS. 6E and 6F each depict a cheek/nasolabial fold RoI; and FIG. 6G depicts a chin RoI.

In some instances, it may be desirable to select only a portion of a particular region of interest for analysis by the CNN. For example, it may be desirable to select a patch of skin disposed in and/or around the center of the region of interest, and scale the selected skin patch to a uniform size. Continuing with this example, the largest rectangle of skin-only area may be extracted from the center of each region of interest and rescaled to a 256 pixel×256 pixel skin patch.

Figure 7:
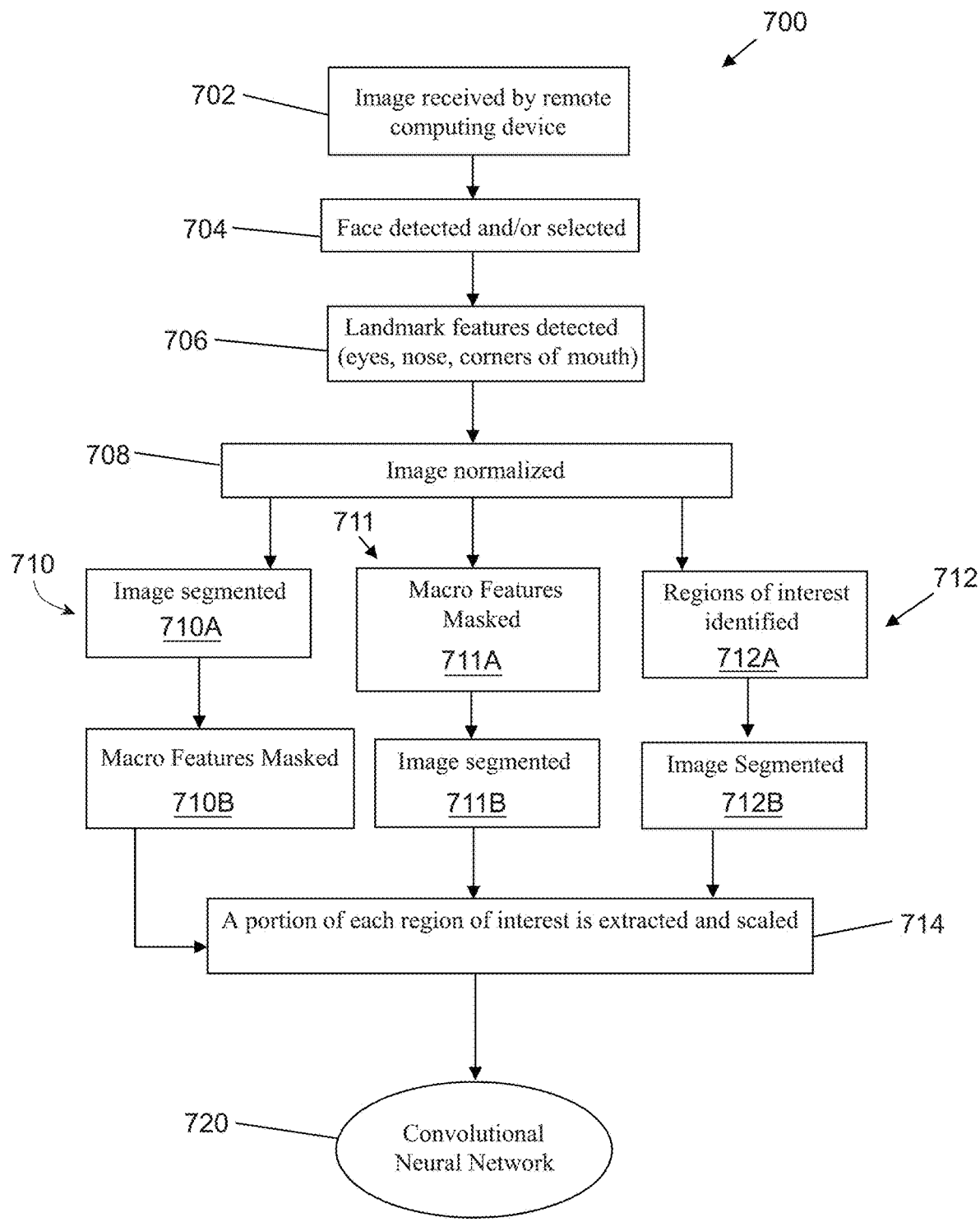
FIG. 7 is a flow diagram of a method of processing an image.

FIG. 7 illustrates the image processing flow path 700 for the methods and systems herein. In block 702, an image is received by the system. In block 704, processing logic causes one or more faces in the received image to be detected or selected for further processing. In block 706, processing logic causes landmark features to be detected in the detected or selected face. In block 708, processing logic causes the image to be normalized. In blocks 710A and 710B, processing logic causes the image to be segmented and the macro features in each segment to be masked as part of a first input variant 710. In blocks 711A and 711B, processing logic causes the macro features in the normalized image to be masked and then segmented as part of a second input variant 711. In blocks 712A and 712B, processing logic causes the system to identify regions of interest for analysis by the CNN, and then segment the image as part of a third input variant 712. In block 714, processing logic causes a portion of each region of interest to be extracted and scaled to a suitable size.

Convolutional Neural Network

The systems and methods herein use a trained convolutional neural network, which functions as an in silico skin model, to provide an apparent skin age to a user by analyzing an image of the skin of a person (e.g., facial skin). The CNN comprises multiple layers of neuron collections that use the same filters for each pixel in a layer. Using the same filters for each pixel in the various combinations of partially and fully connected layers reduces memory and processing requirements of the system. In some instances, the CNN comprises multiple deep networks, which are trained and function as discrete convolutional neural networks for a particular image segment and/or region of interest.

Figure 8:
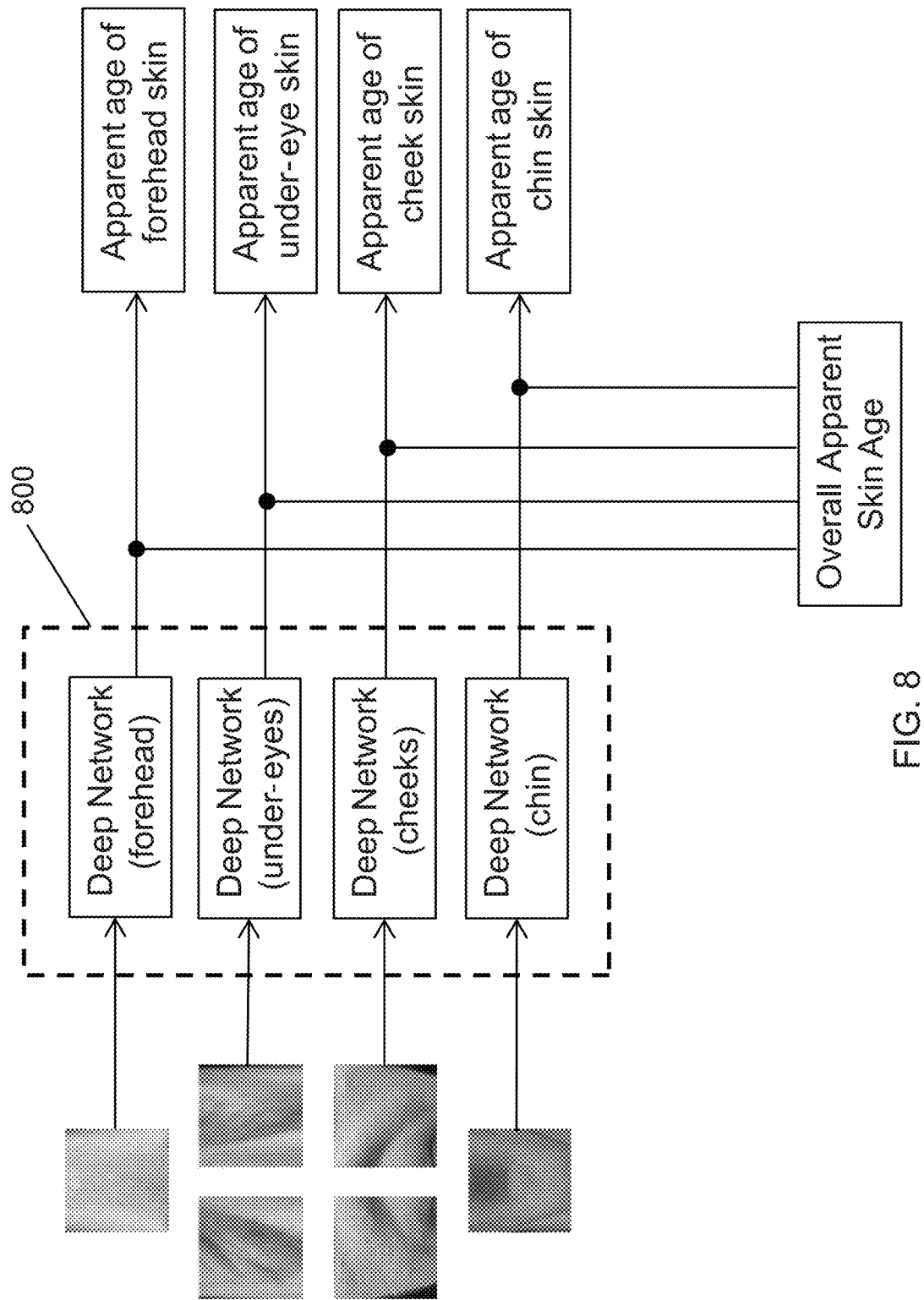
FIGS. 8 and 9 depict a convolutional neural network for determining apparent skin age.

FIG. 8 illustrates an example of a CNN 800 configuration for use herein. As illustrated in FIG. 8, the CNN 800 includes four individual deep networks for analyzing individual regions of interest or portions thereof, which in this example are portions of the forehead, under-eye area, cheeks/nasolabial folds, and chin regions of interest. Of course, it is to be appreciated that the CNN may include fewer deep networks or more deep networks, as desired. The image analysis results from each deep network may be used to provide an apparent skin age for its respective region of interest and/or may be concatenated to provide an overall apparent skin age.

The CNN herein may be trained using a deep learning technique that allows the CNN to learn what portions of an image contribute to skin age, much in the same way as a mammalian visual cortex learns to recognize important features in an image. For example, the CNN may be trained to determine locations, colors, and/or shade (e.g., lightness or darkness) of pixels that contribute to the skin age of a person. In some instances, the CNN training may involve using mini-batch stochastic gradient descent (SGD) with Nesterov momentum (and/or other algorithms). An example of utilizing a stochastic gradient descent is disclosed in U.S. Pat. No. 8,582,807.

In some instances, the CNN may be trained by providing an untrained CNN with a multitude of captured images to learn from. In some instances, the CNN can learn to identify portions of skin in an image that contribute to skin age through a process called supervised learning. "Supervised learning" generally means that the CNN is trained by analyzing images in which the age of the person in the image is predetermined. Depending on the accuracy desired, the number of training images may vary from a few images to a multitude of images (e.g., hundreds or even thousands) to a continuous input of images (i.e., to provide continuous training).

The systems and methods herein utilize a trained CNN that is capable of accurately predicting the apparent age of a user for a wide range of skin types. To generate an apparent age, an image of a region of interest (e.g., obtained from an image of a person's face) or portion thereof is forward-propagating through the trained CNN. The CNN analyzes the image or image portion and identifies skin micro features in the image that contribute to the predicted age of the user ("trouble spots"). The CNN then uses the trouble spots to provide an apparent skin age for the region of interest and/or an overall apparent skin age.

In some instances, an image inputted to the CNN may not be suitable for analysis, for example, due to occlusion (e.g., hair covering a portion of the image, shadowing of a region of interest). In these instances, the CNN or other logic may discard the image prior to analysis by the CNN or discard the results of the CNN analysis prior to generation of an apparent age.

Figure 9:
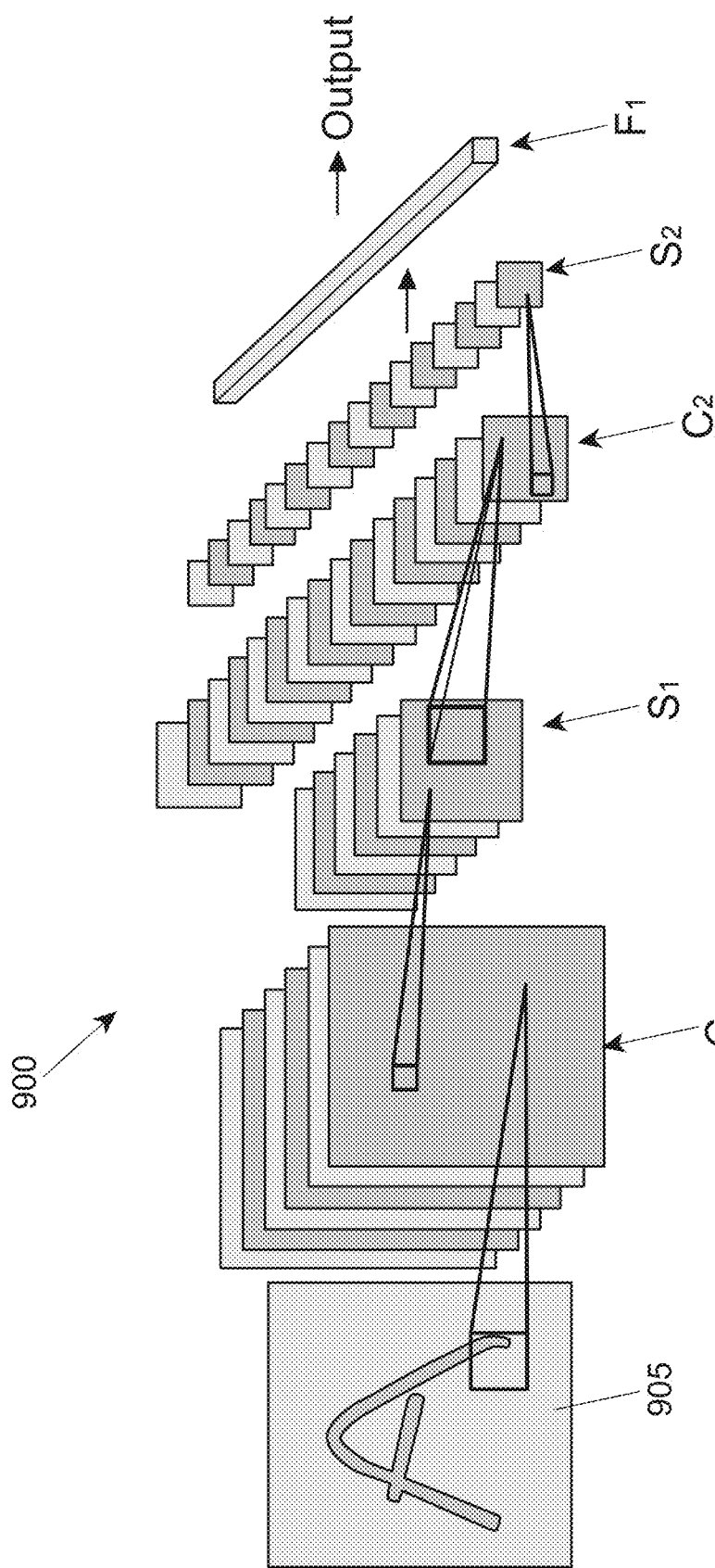

FIG. 9 depicts an example of a convolutional neural network 900 for use in the present system. The CNN 900 may include an inputted image 905 (e.g., region of interest or portion thereof), one or more convolution layers $C_1$, $C_2$, one or more subsampling layers $S_1$ and $S_2$, one or more partially connected layers, one or more fully connected layers, and an output. To begin an analysis or to train the CNN, an image 905 is inputted into the CNN 900 (e.g., the image of a user). The CNN may sample one or more portions of the image to create one or more feature maps in a first convolution layer $C_1$. For example, as illustrated in FIG. 9, the CNN may sample six portions of the image 905 to create six features maps in the first convolution layer $C_1$. Next, the CNN may subsample one or more portions of the feature map(s) in the first convolution layer $C_1$ to create a first subsampling layer $S_1$. In some instances, the subsampled portion of the feature map may be half the area of the feature map. For example, if a feature map comprises a sample area of 29×29 pixels from the image 905, the subsampled area may be 14×14 pixels. The CNN 900 may perform one or more additional levels of sampling and subsampling to provide a second convolution layer $C_2$ and a second subsampling layer $S_2$. It is to be appreciated that the CNN 900 may include any number of convolution layers and subsampling layers as desired. Upon completion of final subsampling layer (e.g., layer $S_2$ in FIG. 9), the CNN 900 generates a fully connected layer $F_1$, in which every neuron is connected to every other neuron. From the fully connected layer $F_1$, the CNN can generate an output such as a predicted age or a heat map.

In some instances, the present system may determine a target skin age (e.g., the apparent age of the person minus a predetermined number of years (e.g., 10, 9, 8, 7, 6, 5, 4, 3, 2, or 1 year)) or the actual age of the person. The system may cause the target age to be propagated back to the original image as a gradient. The absolute value of a plurality of channels of the gradient may then be summed for at least one pixel and scaled from 0-1 for visualization purposes. The value of the scaled pixels may represent pixels that contribute most (and least) to the determination of the skin age of the user. Each scaling value (or range of values) may be assigned a color or shade, such that a virtual mask can be generated to graphically represent the scaled values of the pixels. In some instances, the CNN analysis, optionally in conjunction with habits and practices input provided by a user, can be used to help provide a skin care product and/or regimen recommendation.

Figure 10:
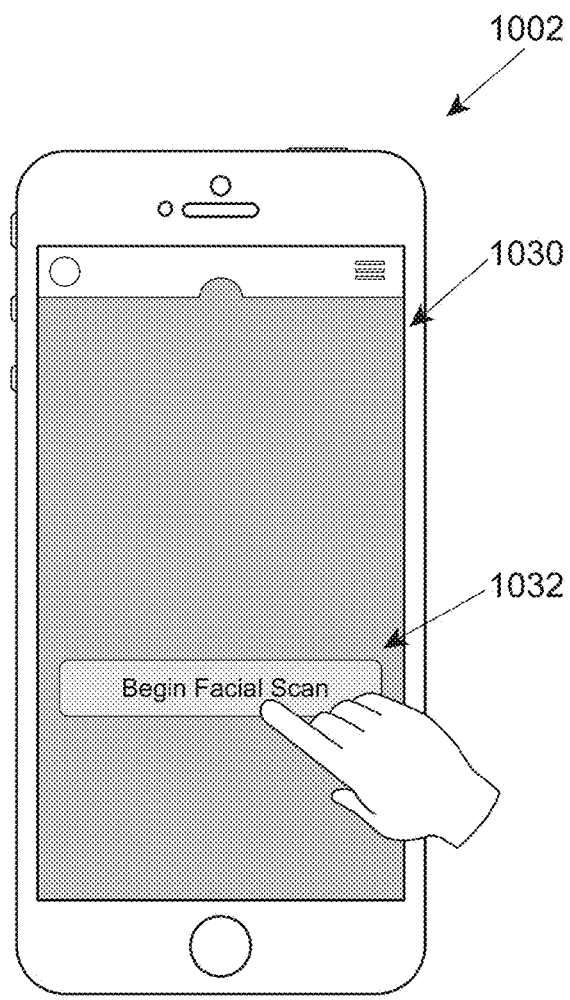
FIGS. 10 to 21 depict exemplary user interfaces.

FIG. 10 depicts an exemplary user interface 1030 for capturing an image of a user and for providing customized product recommendations. As illustrated, the mobile computing device 1002 may provide an application for capturing an image of a user. Accordingly, FIG. 10 depicts an introductory page on the mobile computing device 1002 for beginning the process of capturing an image and providing customized product recommendations. The user interface 1030 also includes a start option 1032 for beginning the process.

Figure 11:
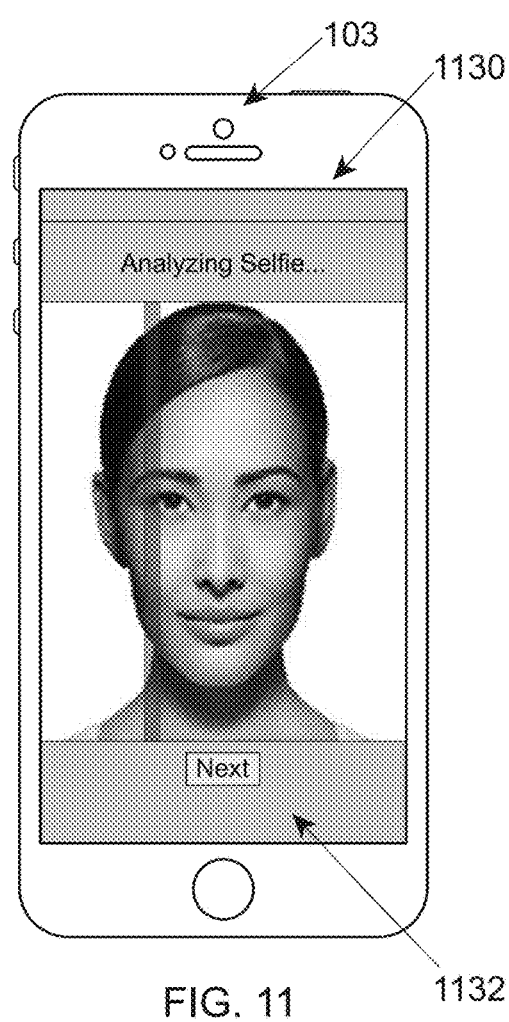

FIG. 11 depicts an exemplary user interface 1130 illustrating an image that is analyzed for providing an apparent skin age and/or customized product recommendations to a user of the present system. In response to selection of the start option 1032 from FIG. 10, the user interface 1130 may be provided. As illustrated, the image capture device 103 may be utilized for capturing an image of the user. In some embodiments, the user may utilize a previously captured image. Regardless, upon capturing the image, the image may be provided in the user interface 1130. If the user does not wish the image be utilized, the user may retake the image. If the user approves the image, the user may select the next option 1132 to begin analyzing the image and proceeding to the next user interface.

Figure 12:
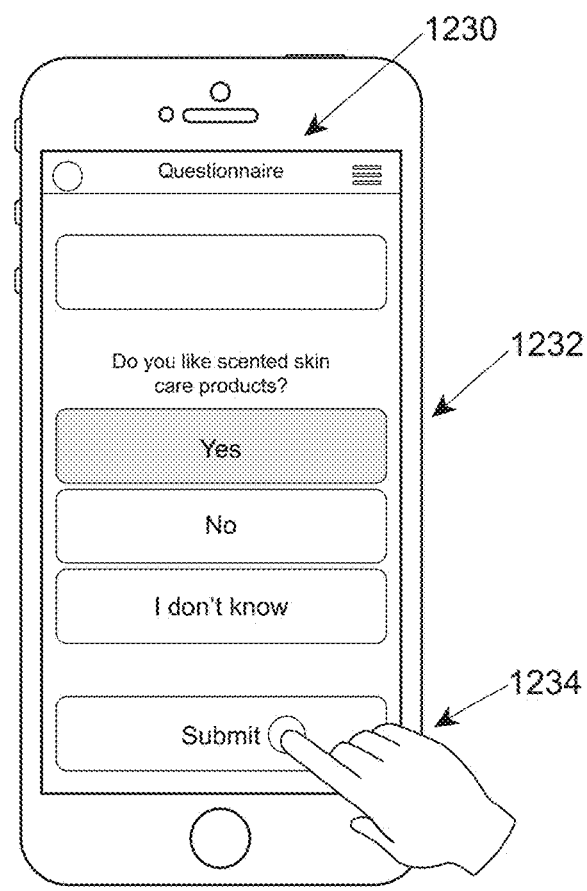

FIG. 12 depicts an exemplary user interface 1230 for providing a questionnaire to a user to help customize product recommendations. As illustrated, the user interface 1230 may provide one or more questions for determining additional details regarding the user, including product preferences, current regimens, etc. As an example, the questions may include whether the user utilizes a moisturizer with sunscreen. One or more predefined answers 1232 may be provided for the user to select from.

Figure 13:
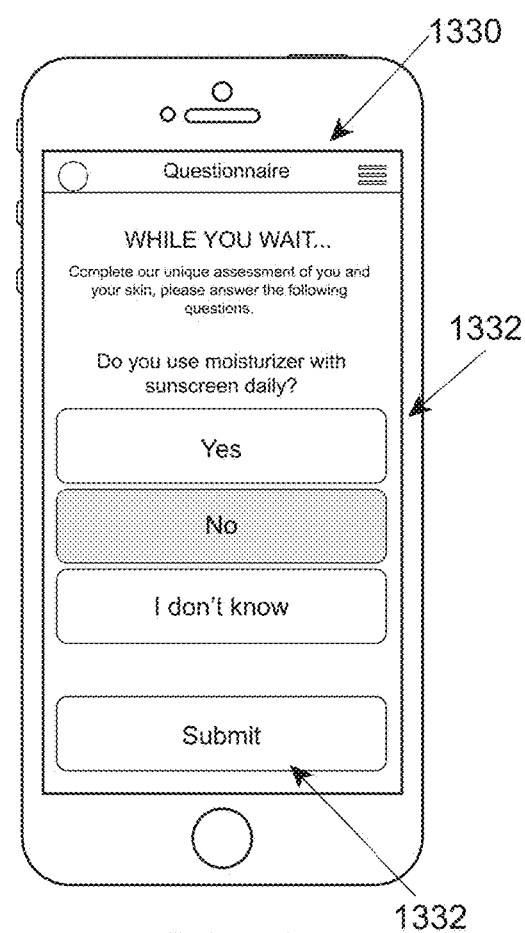
Figure 14:
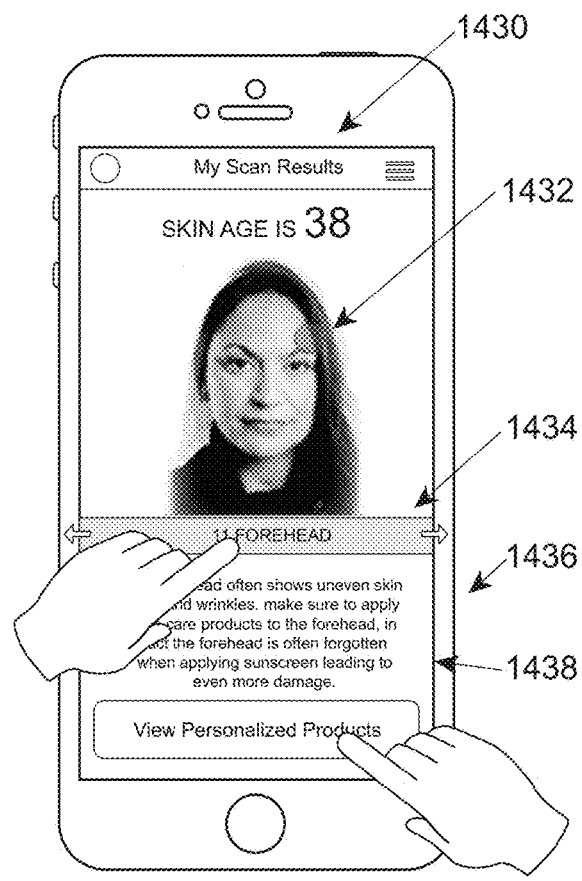

FIG. 13 depicts an exemplary user interface 1330 for providing additional prompts for a questionnaire. In response to entering the requested data from the user interface 1230 of FIG. 12, the user interface 1330 may be provided. As illustrated, the user interface 1330 provides another question (such as whether the user prefers scented skin care products) along with three predefined answers 1332 for the user to select from. A submit option 1334 may also be provided for submitting the selected answer(s). It should be understood that while FIGS. 13 and 14 provide two questions, any number of questions may be provided to the user, depending on the particular embodiment. The questions and number of questions may depend on the user's actual age, which may by inputted in one or more of the steps exemplified herein, on the user's skin age, and/or other factors.

FIG. 14 depicts an exemplary user interface 1430 for providing a skin age of a user, based on a captured image. In response to completing the questionnaire of FIGS. 13 and 14, the user interface 1430 may be provided. As illustrated, the user interface 1430 may provide the user's skin age and the captured image with at least one identifier 1432 to indicate which region(s) of region of interest(s) is/are contributing to the apparent skin age provided by the CNN. In some instances, the system may also provide a list 1434 of the regions of interest that contribute to the apparent skin age provided by the CNN. A description 1436 may also be provided, as well as a product-recommendation option 1438 for viewing customized product recommendations.

Figure 15:
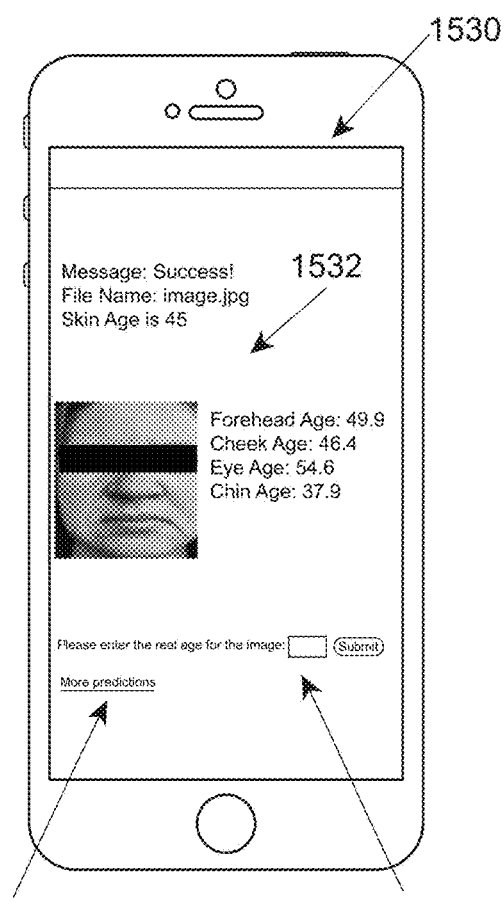

FIG. 15 illustrates another exemplary user interface 1530 for displaying the results of the image analysis. The user interface 1530 may include a results section 1532 that indicates whether the analysis was successful or if there was a problem encountered during the process (e.g., the image quality was poor). The user interface 1530 may include a product-recommendation option (not shown). Additionally or alternatively, the results section 1532 may display an overall apparent skin age to the user and/or an apparent skin age for each region of interest. The user interface 1530 may present the user with an age-input option 1536. An additional-predictions option 1538 may also be provided.

Figure 16:
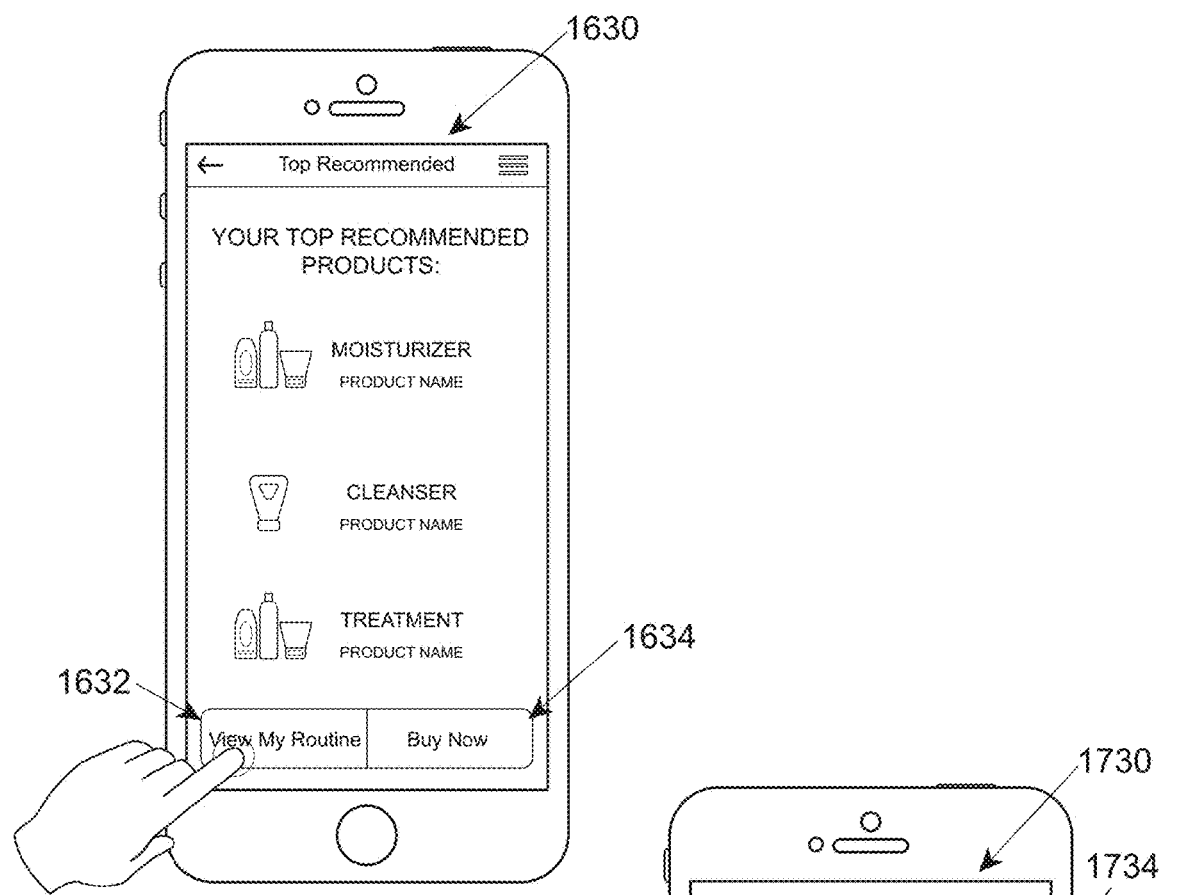

FIG. 16 depicts an exemplary user interface 1630 for providing product recommendations. In response to selection of a product-recommendation option by a user, the user interface 1630 may be provided. As illustrated, the user interface 1630 may provide one or more recommended products that were determined based on the user's age, regions of interest contributing to the user's apparent skin age, and/or the target age (e.g., the apparent skin age and/or actual user's age minus a predetermined number of years). Specifically, the at least one product may be determined as being applicable to skin disposed in the region of interest that contributes most to the apparent skin age of the user. As an example, creams, moisturizers, lotions, sunscreens, cleansers and the like may be recommended. Also provided is a regimen option 1632 for providing a recommended regimen. A purchase option 1634 may also be provided.

Figure 17:
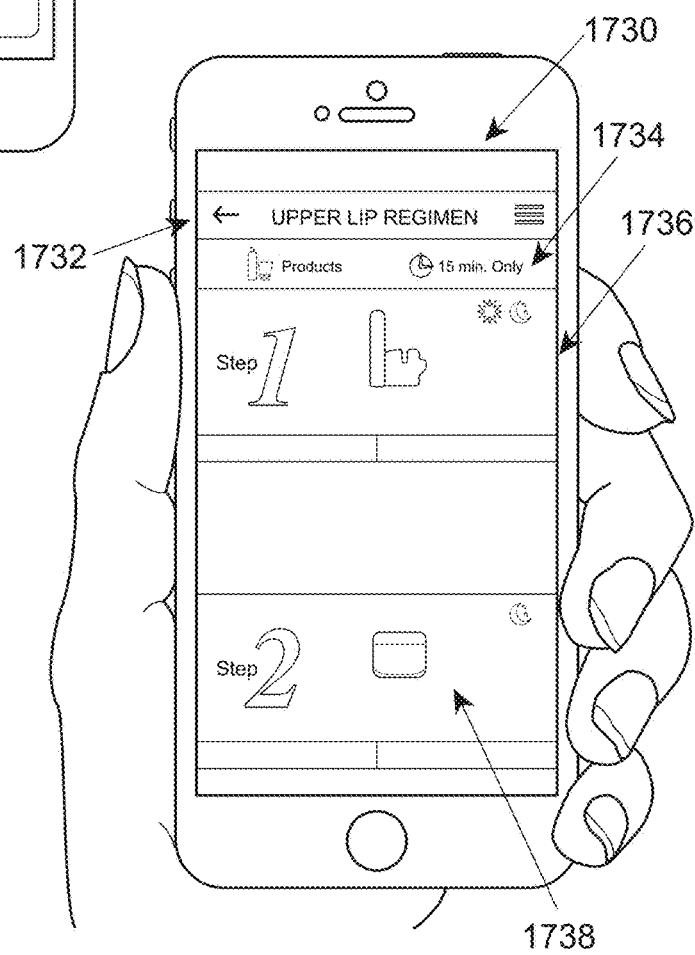

FIG. 17 depicts an exemplary user interface 1730 for providing details of product recommendations. In response to selection of the regimen option 1632 from FIG. 16, the user interface 1730 may be provided. As illustrated, the user interface 1730 may provide a products option 1732 and a schedule option 1734 for using the recommended product in the user's beauty regimen. Additional information related to the first stage of the beauty regimen may be provided in section 1736. Similarly, data related to a second and/or subsequent stage of the regimen may be provided in the section 1738.

Figure 18:
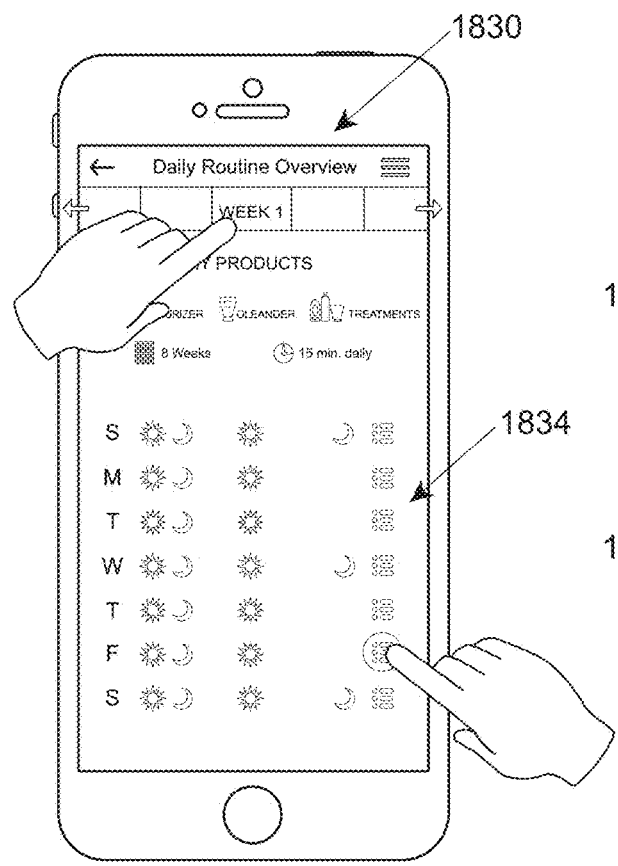

FIG. 18 depicts an exemplary user interface 1830 that provides a recommended beauty regimen. In response to selection of the schedule option 1734 from FIG. 17, the user interface 1830 may be provided. The user interface 1830 may provide a listing of recommended products, as well as a schedule, including schedule details for the regimen. Specifically, the user interface 1830 may provide a time of day that products may be provided. A details option 1834 may provide the user with additional details regarding products and the regimen.

Figure 19:
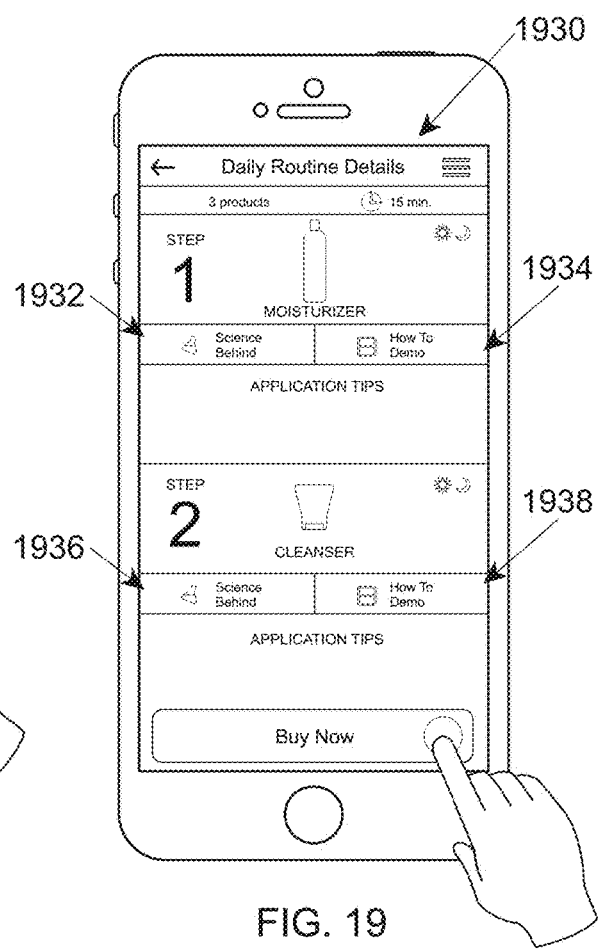

FIG. 19 depicts an exemplary user interface 1930 for providing additional details associated with a beauty regimen and the products used therein. The user interface 1930 may be provided in response to selection of the details option 1834 from FIG. 18. As illustrated, the user interface 1930 may provide details regarding products, application tips, etc. In some instances, a "science-behind" option 1932, 1936 and a "how-to-demo" option 1934, 1938 may be provided. In response to selection of the science behind option 1932, 1936, details regarding the recommended product and the application regimen may be provided. In response to selection of the how to demo option 1934, 1938, audio and/or video may be provided for instructing the user on a strategy for applying the product. Similarly, the subsequent portions of the regimen (such as step 2 depicted in FIG. 19) may also include a science behind option 1932, 1936 and a how to demo option 1934, 1938.

Figure 20:
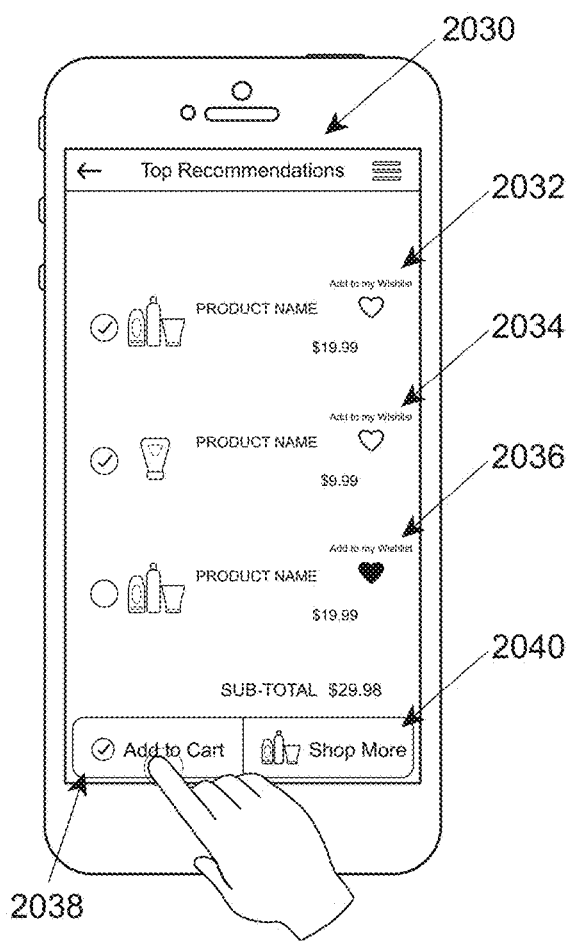

FIG. 20 depicts an exemplary user interface 2030 for providing recommendations related to a determined regimen. In response to selection of the purchase option 1634 (FIG. 16), the user interface 2030 may be provided. As illustrated, the user interface 2030 includes purchasing options 2032, 2034, 2036 for purchasing one or more recommended products. The user interface 2030 may also provide an add-to-cart option 2038 and a shop-more option 2040.

Figure 21:
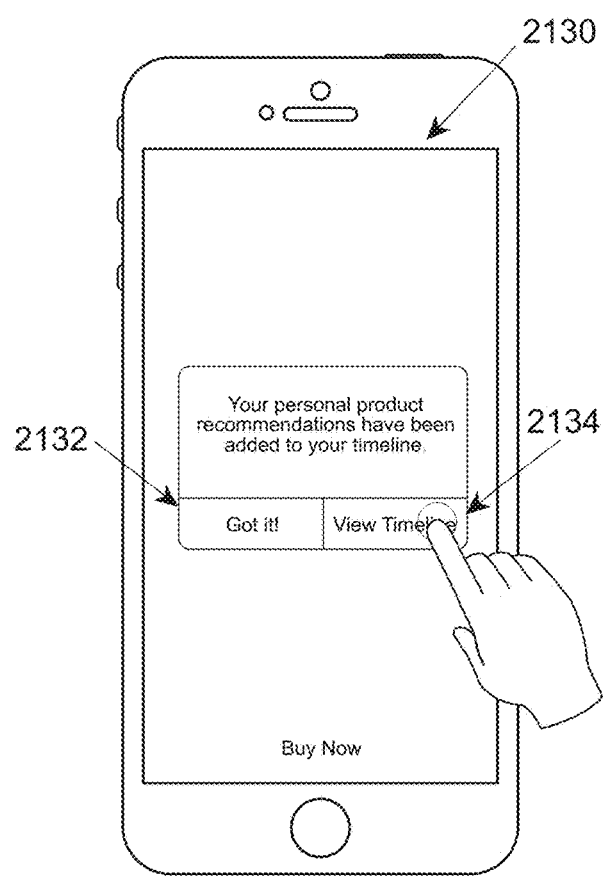

FIG. 21 depicts an exemplary user interface 2130 for providing product recommendations to a user timeline. As illustrated, the user interface 2130 may provide a notification that one or more of the recommended products have been added to the user's timeline. Upon purchasing a product (e.g., via the user interface 1930 from FIG. 19), the purchased products may be added to the recommended regimen for the user. As such, the notification may include an acceptance option 2132 and a view timeline option 2134.

Figure 22:
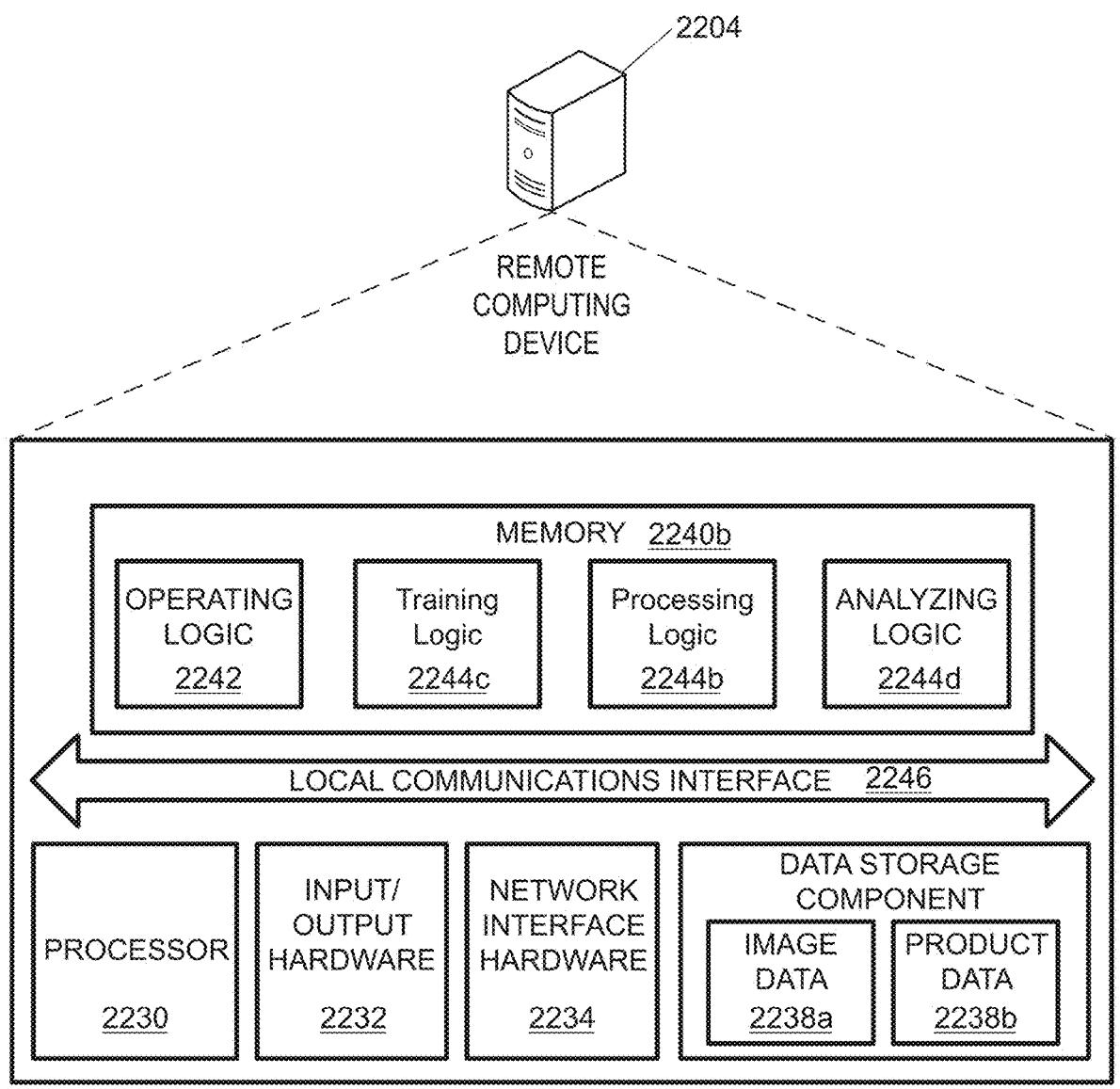
FIG. 22 illustrates a remote computing device for providing skin care product and/or regimen recommendations.

FIG. 22 depicts components of a remote computing device 2204 for providing customized skin care product and/or regimen recommendations, according to embodiments described herein. The remote computing device 2204 includes a processor 2230, input/output hardware 2232, network interface hardware 2234, a data storage component 2236 (which stores image data 2238*a*, product data 2238*b*, and/or other data), and the memory component 2240*b*. The memory component 2240*b* may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 2204 and/or external to the remote computing device 2204.

The memory component 2240*b* may store operating logic 2242, processing logic 2244*b*, training logic 2244*c*, and analyzing logic 2244*d*. The training logic 2244*c*, processing logic 2244*b*, and analyzing logic 2244*d* may each include a plurality of different pieces of logic, each of which may be embodied as a computer program, firmware, and/or hardware, as an example. A local communications interface 2246 is also included in FIG. 22 and may be implemented as a bus or other communication interface to facilitate communication among the components of the remote computing device 2204.

The processor 2230 may include any processing component operable to receive and execute instructions (such as from a data storage component 2236 and/or the memory component 2240*b*). As described above, the input/output hardware 2232 may include and/or be configured to interface with the components of FIG. 22.

The network interface hardware 2234 may include and/or be configured for communicating with any wired or wireless networking hardware, including an antenna, a modem, a LAN port, wireless fidelity (Wi-Fi) card, WiMax card, Bluetooth™ module, mobile communications hardware, and/or other hardware for communicating with other networks and/or devices. From this connection, communication may be facilitated between the remote computing device 2204 and other computing devices, such as those depicted in FIG. 1.

The operating system logic 2242 may include an operating system and/or other software for managing components of the remote computing device 2204. As discussed above, the training logic 2244*c* may reside in the memory component 2240*b* and may be configured to cause the processor 2230 to train the convolutional neural network. The processing logic 2244*b* may also reside in the memory component 2244*b* and be configured to process images prior to analysis by the analyzing logic 2244*d*. Similarly, the analyzing logic 2244*d* may be utilized to analyze images for skin age prediction.

It should be understood that while the components in FIG. 22 are illustrated as residing within the remote computing device 2204, this is merely an example. In some embodiments, one or more of the components may reside external to the remote computing device 2204 and/or the remote computing device 2204 may be configured as a mobile device. It should also be understood that, while the remote computing device 2204 is illustrated as a single device, this is also merely an example. In some embodiments, the training logic 2244*c*, the processing logic 2244*b*, and/or the analyzing logic 2244*d* may reside on different computing devices. As an example, one or more of the functionalities and/or components described herein may be provided by the mobile computing device 102 and/or other devices, which may be communicatively coupled to the remote computing device 104. These computing devices may also include hardware and/or software for performing the functionality described herein.

Additionally, while the remote computing device 2204 is illustrated with the training logic 2244*c*, processing logic 2244*b*, and analyzing logic 2244*d* as separate logical components, this is also an example. In some embodiments, a single piece of logic may cause the remote computing device 2204 to provide the described functionality.

Figure 23:
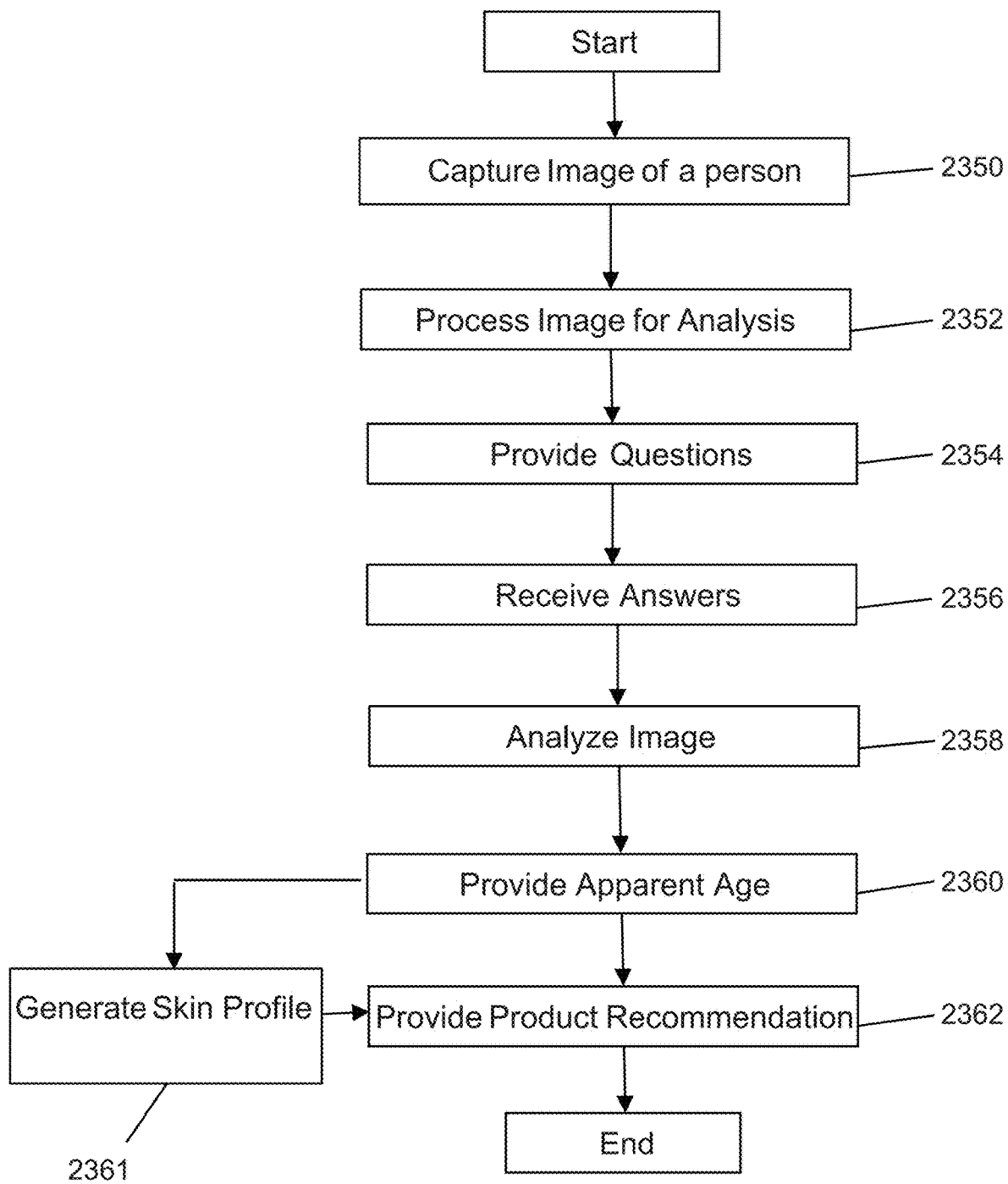
FIG. 23 is a flow diagram of a method of providing a product recommendation to a user.

FIG. 23 depicts a flowchart for providing customized product recommendations. In block 2350, an image of a user is captured. In block 2352, the captured image is processed for analysis. In block 2354, questions are provided to the user. In block 2356, answers to the questions are received from the user. In block 2358, the image is analyzed by the CNN. In block 2360, an apparent skin age is provided to the user. In block 2361, an optional skin profile may be generated. The optional skin profile may include, for example, the age of one or more of the regions of interest, a skin condition, or the influence a particular region of interest has on overall skin age. In block 2362, a customized product recommendation is provided to the user.

In some instances, at least some of the images and other data described herein may be stored as historical data for later use. As an example, tracking of user progress may be determined based on this historical data. Other analyses may also be performed on this historical data, as desired.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for determining an apparent skin age of a person, comprising: a non-transitory computer readable storage medium with logic stored thereon, wherein the logic causes the system to
   a) receive a digital image comprising a human face;
   b) process the digital image for analysis, wherein processing comprises locating the human face in the digital image, segmenting the digital image into two or more image segments, and masking at least one macro feature present on the face;

c) analyze the processed image using a convolutional neural network (CNN) comprising a discrete deep neural network for each image segment, wherein the analysis includes identifying in a region of interest in each image segment at least one pixel disposed in a facial micro feature that is indicative of the person's skin age;

d) determine with the CNN an overall apparent skin age of the person based on the analysis of each deep neural network; and e) display the overall apparent skin age on a display device visible to a user.

2. The system of claim 1, further comprising an image capture device coupled to a computer, wherein the digital image is captured by the image capture device and received by the computer.

3. The system of claim 1, wherein masking the macro feature comprises replacing pixels in the facial macro feature with pixels that have a median RGB value of skin disposed in a region of interest.

4. The system of claim 1, wherein a result of each analysis from each deep neural network is used to determine an apparent skin age for that region of interest.

5. The system of claim 4, wherein results from all the deep neural network analyses are concatenated to provide an overall apparent skin age.

6. The system of claim 1, wherein processing the image further includes providing two or more input variations to the CNN.

7. The system of claim 6, wherein the image is segmented and then the macro feature is masked to provide a first input variation.

8. The system of claim 7, wherein the macro feature is masked and then the image is segmented to provide a second input variation.

9. A method of determining the apparent skin age of a person, comprising:

a) receiving an image of the person, wherein the image includes at least a portion of the person's face;

b) processing the image with a computer, wherein processing the image includes identifying the portion of the image comprising the face, segmenting the digital image into two or more image segments, and masking a macro feature of the face;

c) analyzing the image using a convolutional neural network comprising a discrete deep neural network for each image segment stored on a memory component of the computer to provide an apparent skin age, wherein analyzing the image includes identifying in a region of interest in each image segment at least one pixel that is indicative of skin age and utilizing the at least one pixel from each image segment to provide an overall apparent skin age; and d) displaying the overall apparent skin age on a display device visible to a user.

10. The method of claim 9, further comprising an image capture device coupled to a computer, wherein the digital image is captured by the image capture device and received by the computer.

11. The method of claim 9, wherein masking the macro feature comprises replacing pixels in the facial macro feature with pixels that have a median RGB value of skin disposed in a region of interest.

12. The method of claim 9, wherein a result of each analysis from each deep neural network is used to determine an apparent skin age for that region of interest.

13. The method of claim 12, further comprising concatenating results from all the deep neural network analyses to provide the overall apparent skin age.

14. The method of claim 9, wherein processing the image further includes providing two or more input variations to the CNN.

15. The method of claim 14, wherein the image is segmented and then the macro feature is masked to provide a first input variation.

16. The method of claim 15, wherein a first input variation is provided by segmenting the image and then masking the macro feature, and a second input variation is provided by masking the macro feature and then segmenting the image.

17. A system for determining an apparent skin age of a person, comprising: a non-transitory computer readable storage medium with logic stored thereon, wherein the logic causes the system to:

a) receive a digital image comprising a human face;

b) process the digital image for analysis, wherein processing comprises locating the human face in the digital image and masking at least one macro feature present on the face;

c) segmenting the digital image into two or more image segments;

d) scaling the segmented digital image such that the full height of the facial image does not exceed 800 pixels;

e) bounding the digital image in a bounding box to remove at least one of a background feature and a macro feature;

f) analyze the processed image using a convolutional neural network (CNN) comprising a discrete deep neural network for each image segment, wherein each deep neural network is trained to identify at least one pixel disposed in a facial micro feature that is indicative of the person's skin age, and wherein each discrete neural network generates an apparent skin age for a region of interest in its respective image segment;

g) determine with the CNN an overall apparent skin age of the person based on the apparent skin age from each deep neural network; and h) display the overall apparent skin age on a display device visible to a user.

18. The system of claim 17, wherein the human face is located in the digital image using a Viola-Jones weak cascade technique.

* * * * *